(12) United States Patent
Chen

(10) Patent No.: US 12,546,997 B2
(45) Date of Patent: Feb. 10, 2026

(54) HEAD UP DISPLAY DEVICE THAT UTILIZES A BACKLIGHT TOROIDAL MIRROR TO ADJUST AN EYE BOX

(71) Applicant: E-LEAD ELECTRONIC CO., LTD., Changhua (TW)

(72) Inventor: Stephen Chen, Changhua (TW)

( * ) Notice: Subject to any disclaimer, the term of this patent is extended or adjusted under 35 U.S.C. 154(b) by 299 days.

(21) Appl. No.: 18/393,727

(22) Filed: Dec. 22, 2023

(65) Prior Publication Data

US 2025/0208414 A1  Jun. 26, 2025

(51) Int. Cl.
*G02B 27/01* (2006.01)
*G02B 7/182* (2021.01)
*G02B 17/06* (2006.01)

(52) U.S. Cl.
CPC ....... *G02B 27/0101* (2013.01); *G02B 7/1821* (2013.01); *G02B 17/0642* (2013.01); *G02B 2027/0159* (2013.01); *G02B 2027/0187* (2013.01)

(58) Field of Classification Search
CPC ........ G02B 27/0101; G02B 2027/0187; G02B 2027/0154; G02B 2027/0159; G02B 7/1821; G02B 17/0642
See application file for complete search history.

(56) References Cited

U.S. PATENT DOCUMENTS

| | | | |
|---|---|---|---|
| 2019/0011712 A1* | 1/2019 | Nagano | B60K 35/23 |
| 2020/0143184 A1* | 5/2020 | Naradikian | H04N 23/20 |
| 2020/0338987 A1* | 10/2020 | Ichikawa | B60K 35/22 |
| 2023/0393396 A1* | 12/2023 | Cho | G02B 27/0093 |
| 2023/0418056 A1* | 12/2023 | Chen | G02B 27/0149 |
| 2024/0385432 A1* | 11/2024 | Chen | G02B 17/0642 |
| 2025/0020924 A1* | 1/2025 | Maruoka | B60K 35/22 |

* cited by examiner

*Primary Examiner* — Jia X Pan
(74) *Attorney, Agent, or Firm* — Bruce Stone LLP; Joseph A. Bruce

(57) ABSTRACT

A head up display that utilizes a backlight Toroidal mirror to adjust the eye box is suitable for use with an imaging semi-reflector and includes a backlight source, a backlight Toroidal mirror, a display panel, and an imaging concave mirror. The backlight Toroidal mirror is rotatable and has an X-axis curvature and a Y-axis curvature different from the X-axis curvature, and can reflect the backlight beam of the backlight source. The backlight beam reflected by the backlight Toroidal mirror forms a backlight real image located in the viewer's eye after passing through the display panel, the imaging concave mirror, and the imaging semi-reflector. The backlight real image is called the eye box. The rotation of the backlight Toroidal mirror elongates or shortens the eye box, allowing the viewer's eyes to remain inside the eye box when the viewer's eyes are moving back and forth.

9 Claims, 17 Drawing Sheets

| curvature | focal length | off-axis direction | off-axis effect | off-axis equivalent focal length |
|---|---|---|---|---|
| X>Y | $FL\_x < FL\_y$ | X | $FL\_x \uparrow$ $FL\_y \downarrow$ | $FL'\_x \fallingdotseq FL'\_y$ |
| X>Y | $FL\_x < FL\_y$ | Y | $FL\_x \downarrow$ $FL\_y \uparrow$ | $FL'\_x \ll FL'\_y$ |
| X<Y | $FL\_x > FL\_y$ | X | $FL\_x \uparrow$ $FL\_y \downarrow$ | $FL'\_x \gg FL'\_y$ |
| X<Y | $FL\_x > FL\_y$ | Y | $FL\_x \downarrow$ $FL\_y \uparrow$ | $FL'\_x \fallingdotseq FL'\_y$ |

| rotation angle 0°→90°, $FL\_x \leftarrow \rightarrow FL\_y$ | | rotation angle 90°→0°, $FL\_y \leftarrow \rightarrow FL\_x$ | |
|---|---|---|---|
| equivalent focal length | effect | equivalent focal length | effect |
| $FL''\_x \gg FL''\_y$ | elongate the real image | $FL''\_x \fallingdotseq FL''\_y$ | shorten the real image |
| $FL''\_x \fallingdotseq FL''\_y$ | shorten the real image | $FL''\_x \ll FL''\_y$ | elongate the real image |
| $FL''\_x \fallingdotseq FL''\_y$ | shorten the real image | $FL''\_x \gg FL''\_y$ | elongate the real image |
| $FL''\_x \ll FL''\_y$ | elongate the real image | $FL''\_x \fallingdotseq FL''\_y$ | shorten the real image |

FIG.12

HEAD UP DISPLAY DEVICE THAT UTILIZES A BACKLIGHT TOROIDAL MIRROR TO ADJUST AN EYE BOX

BACKGROUND

Field of the Invention

The present invention relates to a head display device, and more particularly to a head up display device that utilizes a backlight Toroidal mirror to adjust an eye box.

Description of Related Art

As shown in FIGS. 1A and 1B, a conventional backlight concave mirror Mr_BL is used to reflect the backlight Lt_BL emitted by a backlight source BL to form backlight beam Bm_BL, a backlight virtual image BL_im is formed behind the backlight concave mirror Mr_BL, and the backlight beam Bm_BL forms image beam Bm_G after penetrating a display panel DP. The image beam Bm_G is then reflected by a imaging concave mirror Mr_F. The display panel DP forms a virtual image DP_im behind the imaging concave mirror Mr_F, and the backlight virtual image BL_im forms a backlight real image BL_re in front of the imaging concave mirror Mr_F.

After the virtual image DP_im behind the imaging concave mirror Mr_F is reflected by the imaging semi-reflector Mr_SR, the image virtual image DP_im in front of the vehicle is formed. After the backlight real image BL_re in front of the imaging concave mirror Mr_F is reflected by the imaging semi-reflector Mr_SR, the backlight real image BL_re is formed in the viewer's eyes E, that is, eye box EB.

The imaging semi-mirror Mr_SR can be the windshield as shown in FIG. 1A, or the combiner, as shown in FIG. 1B.

As shown in FIG. 1C, when the viewer's eyes E move back and forth, the original position of the eye box EB will not be able to overlap with the moved eyes E, causing the image seen by the viewer to become dim, blurry, defective, or even invisible.

SUMMARY

To solve the above problem, the present invention provides a rotating backlight Toroidal mirror to adjust the head up display device of the eye box, which enables the viewer to see view bright, clear, and complete images when the viewer's eyes move back and forth.

A head up display device that utilizes a backlight Toroidal mirror to adjust an eye box is provided in accordance with an embodiment of the invention, suitable for use with an imaging semi-reflector, and comprises: a backlight source for projecting a backlight beam; the backlight Toroidal mirror being rotatable and including an X-axis curvature in an axis X and a Y-axis curvature in an axis Y, wherein the X-axis curvature is different from the Y-axis curvature, and the backlight Toroidal mirror is used to reflect the backlight beam of the backlight light source; a display panel configured to display an image and the backlight beam from the backlight Toroidal mirror passing through the display panel to form an image beam; and an imaging concave mirror configured to reflect the image beam to the imaging semi-reflector to form a display panel virtual image on a side of the imaging semi-reflector away from a viewer, and a backlight real image which is on another side of the imaging semi-reflector close to the viewer and in the viewer's eyes, wherein the backlight real image is the eye box; wherein there is an off axis optical path between the backlight source and the backlight Toroidal mirror, the backlight source is reflected and focused on an X-axis backlight focusing plane by the X-axis curvature, the backlight source is reflected and focused on a Y-axis backlight focusing plane by the Y-axis curvature, a range of the eye box is from the X-axis backlight focusing plane to the Y-axis backlight focusing plane, a rotation of the backlight Toroidal mirror elongates or shortens the range of the eye box on an imaging optical path of the backlight real image, so that the viewer's eyes remain within the eye box while moving along the imaging optical path of the backlight real image.

Optionally, the backlight Toroidal mirror rotates around its central axis.

Optionally, when there is an included angle in the direction of the axis Y between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is less than the Y-axis curvature, the range of the eye box elongates as the rotation angle increases from 0 degrees to 90 degrees, and shortens as the rotation angle decreases from 90 degrees to 0 degrees.

Optionally, when there is an included angle in the direction of the axis Y between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is larger than the Y-axis curvature, the range of the eye box shortens as the rotation angle increases from 0 degrees to 90 degrees, and elongates as the rotation angle decreases from 90 degrees to 0 degrees.

Optionally, when there is an included angle in the direction of the axis X between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is less than the Y-axis curvature, the range of the eye box shortens as the rotation angle increases from 0 degrees to 90 degrees, and elongates as the rotation angle decreases from 90 degrees to 0 degrees.

Optionally, when there is an included angle in the direction of the axis X between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is larger than the Y-axis curvature, the range of the eye box elongates as the rotation angle increases from 0 degrees to 90 degrees, and shortens as the rotation angle decreases from 90 degrees to 0 degrees.

Optionally, the brightness of the backlight source is increased when the backlight Toroidal mirror rotates to elongate the range of the eye box.

Optionally, the brightness of the backlight source is decreased when the backlight Toroidal mirror rotates to shorten the range of the eye box.

Optionally, the imaging semi-reflector is a windshield or a combiner for reflecting a portion of the image beam from the imaging concave mirror to the viewer's eyes, while allowing a portion of the light from the scene in front of the viewer to penetrate the imaging semi-reflector and reach the viewer's eyes.

BRIEF DESCRIPTION OF THE DRAWINGS

After studying the detailed description in conjunction with the following drawings, other aspects and advantages of the present invention will be discovered:

FIG. 12 shows a list of the curvature configurations of different backlight Toroidal mirrors, paired with different off axis directions and different rotation angle changes, corresponding to the elongating or shortening of the backlight real image;

DETAILED DESCRIPTION

Figure 1A:
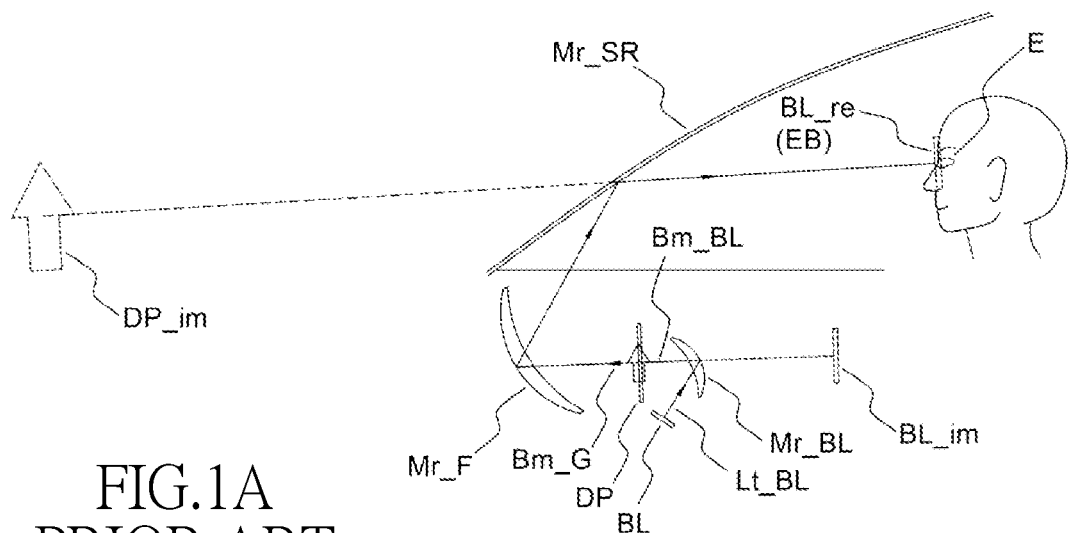
FIG. 1A is a schematic diagram of a conventional head up display device using windshield projection.
Figure 1B:
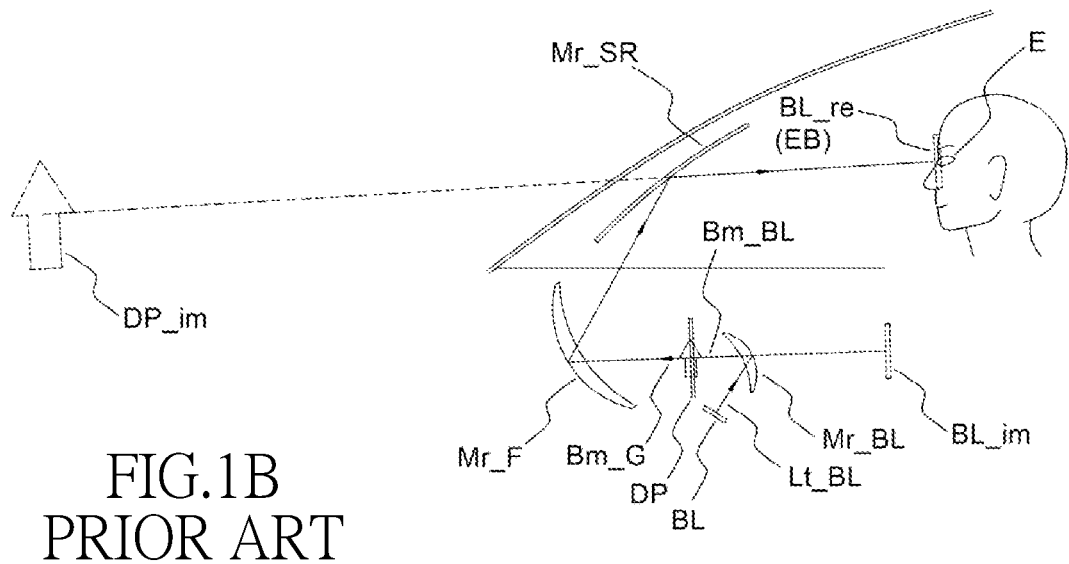
FIG. 1B is a schematic diagram of a conventional head up display device using combiner projection.
Figure 1C:
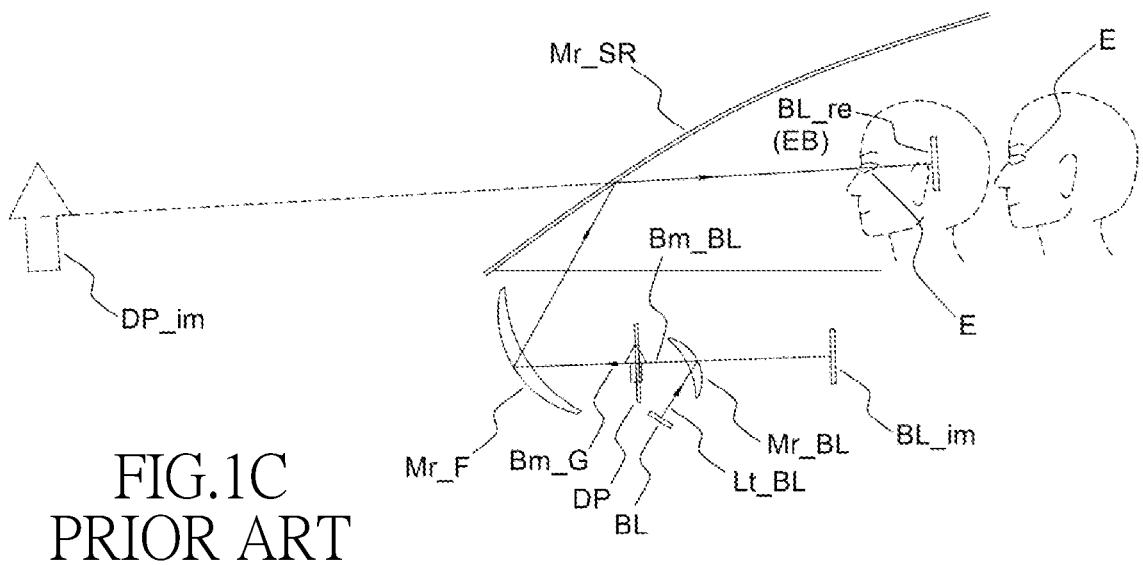
FIG. 1C is a schematic diagram of the conventional head up display device of FIG. 1A showing the movement of the viewer's eyes position moving back and forth.

Please refer to FIGS. 2A to 17C, a head up display device according to an embodiment of the present invention can use a backlight Toroidal mirror to adjust the eye box EB, which is suitable for use with an imaging semi-reflector Mr_SR and includes a backlight source BL, a backlight Toroidal mirror TMr, a display panel DP, and an imaging concave mirror Mr_F. The imaging semi-reflector Mr_SR can be a windshield as shown in FIG. 1A or a combiner as shown in FIG. 1B. The following will be illustrated by the example of the imaging semi-reflector Mr_SR as a windshield.

The backlight source BL can project a backlight beam to the backlight Toroidal mirror TMr.

Figure 2A:
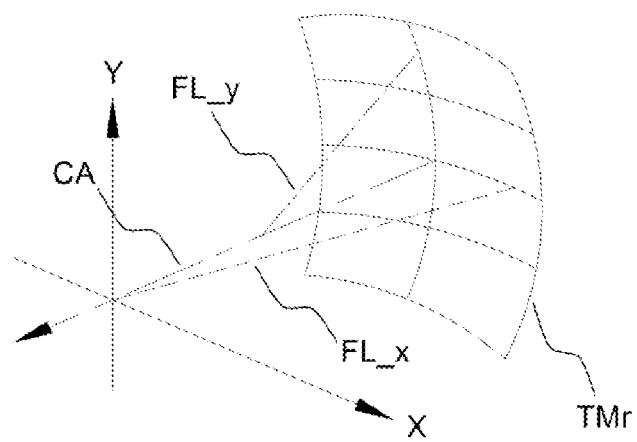
FIGS. 2A and 2B are schematic diagrams of the backlight Toroidal mirror used in the head up display.
Figure 2B:
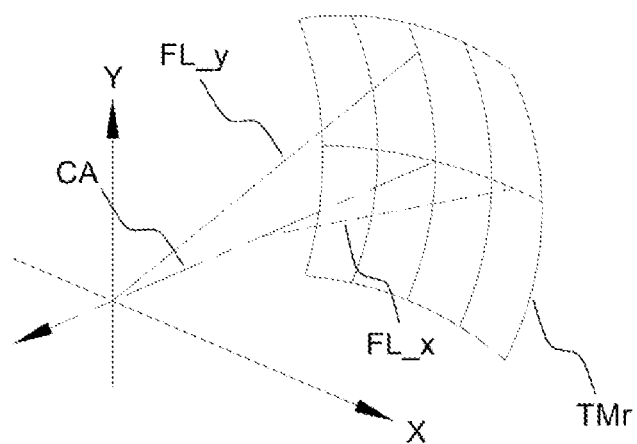

Due to the off axis optical path design of the head up display device, rather than the coaxial optical path design, in order to maintain bright and clear images without distortion, the backlight concave mirror and the imaging concave mirror used are both concave mirrors with two curvatures (namely the Toroidal mirror). There is an off axis optical path between the backlight source BL and the backlight Toroidal mirror TMr. There is an included angle between the optical axis of the backlight beam and the central axis of the backlight Toroidal mirror, which is greater than 0 degrees but less than 90 degrees. The backlight Toroidal mirror TMr is rotatable and has an X-axis curvature and a Y-axis curvature. The X-axis curvature refers to the curvature along the X-axis, while the Y-axis curvature refers to the curvature along the Y-axis, and the X-axis curvature is different from the Y-axis curvature. The backlight Toroidal mirror TMr can reflect the backlight beam of the backlight source BL to the display panel DP. The backlight Toroidal mirror TMr, for example, can be the backlight Toroidal mirror TMr shown in FIG. 2A, with a focal length $FL\_x$ corresponding to its X-axis curvature being greater than the focal length $FL\_Y$ corresponding to the Y-axis curvature; Or, it can be the Toroidal mirror TMr as shown in FIG. 2B, where the focal length $FL\_x$ corresponding to the X-axis curvature is less than the focal length $FL\_y$ corresponding to the Y-axis curvature.

The display panel DP can display an image and the backlight beam from the backlight Toroidal mirror TMr can pass through the display panel DP to form an image beam.

The imaging concave mirror Mr_F can reflect the image beam to the imaging semi-reflector Mr_SR to form a display panel virtual image on the side of the imaging semi-reflector Mr_SR away from the viewer, and a backlight real image (BL_re1~BL_re15) on the side of the imaging semi-reflector Mr_SR close to the viewer and in the viewer's eye. The backlight real image is eye box EB.

The rotation of the backlight Toroidal mirror TMr elongates or shortens the eye box EB on the imaging path of the backlight real image, thereby allowing the viewer's eyes to remain inside the eye box EB while moving on the imaging optical path of the backlight real image.

The following is an exemplary explanation of the function and principle of the backlight Toroidal mirror TMr.

Figure 3A:
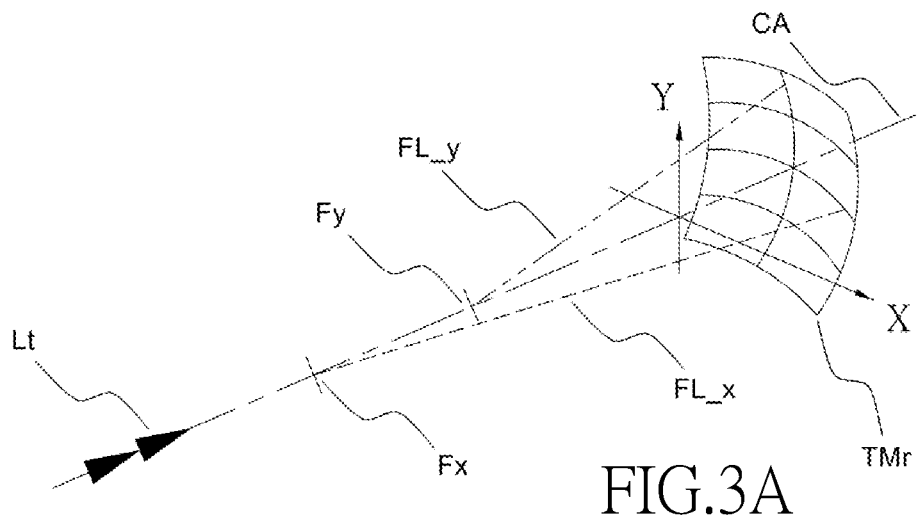
FIGS. 3A, 3B, and 3C are schematic diagrams showing the equivalent focal lengths in the X-axis and Y-axis when the backlight Toroidal mirror is at different incidence angles.

As shown in FIG. 3A, when the light Lt travels on the central axis CA of the backlight Toroidal mirror TMr, the focal length FL_x of the focal point Fx on an axis X is greater than a focal length FL_y of a focal point Fy on an axis Y.

Figure 3B:
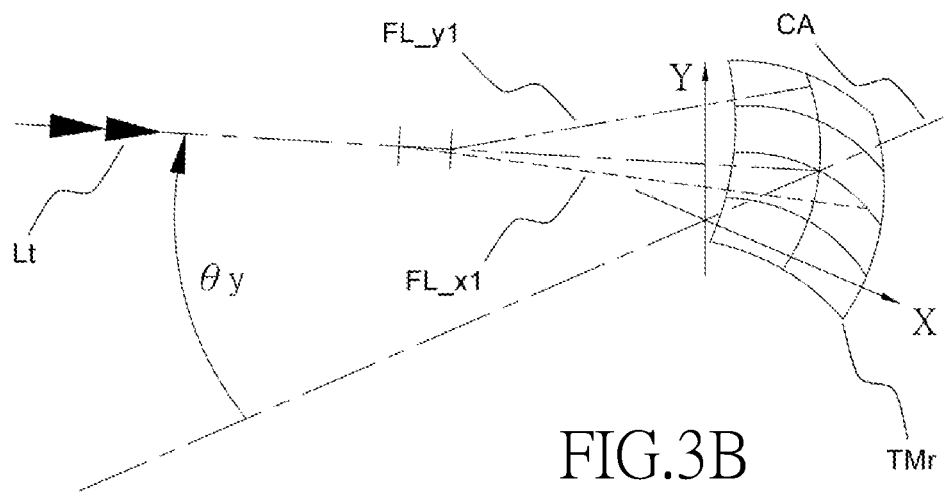

As shown in FIG. 3B, when the optical path of the light Lt rotates by an angle θ y greater than 0 degrees in the axis Y with the center of the backlight Toroidal mirror TMr as the pivot point, the equivalent focal length FL_x1 corresponding to the X-axis curvature is shortened to FL_x×Cos θ y, and the equivalent focal length FL_y1 corresponding to the Y-axis curvature is elongated to FL_y/cos θ y. If the focal lengths FL_x and FL_y and the angle θ y are designed appropriately, the equivalent focal length FL_x1 can be almost equal to the equivalent focal length FL_y1, which is FL_x×Cos θ y=FL_y/cos θ y.

Figure 3C:
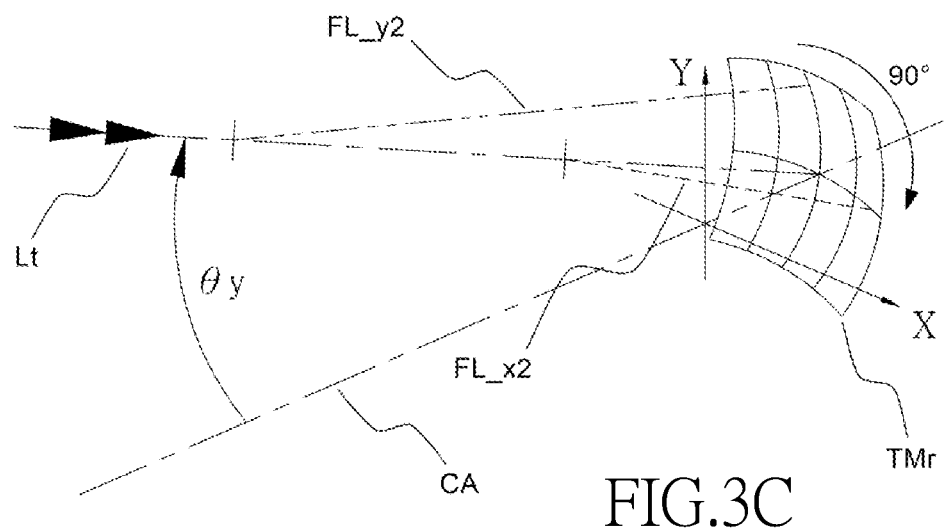

As shown in FIG. 3C, rotate the backlight Toroidal mirror TMr shown in FIG. 3B 90 degrees about its central axis CA, so that the value of the X-axis curvature is exchanged with that of the Y-axis curvature. At this point, the equivalent focal length FL_x2 corresponding to the X-axis curvature becomes the shorter FL_y×Cos θ y, and the equivalent focal length FL_y2 corresponding to the Y-axis curvature becomes the longer FL_x/cos θ y, that is FL_x/cos θ y>FL_x>FL_y>FL_y×Cos θ y.

Figure 4:
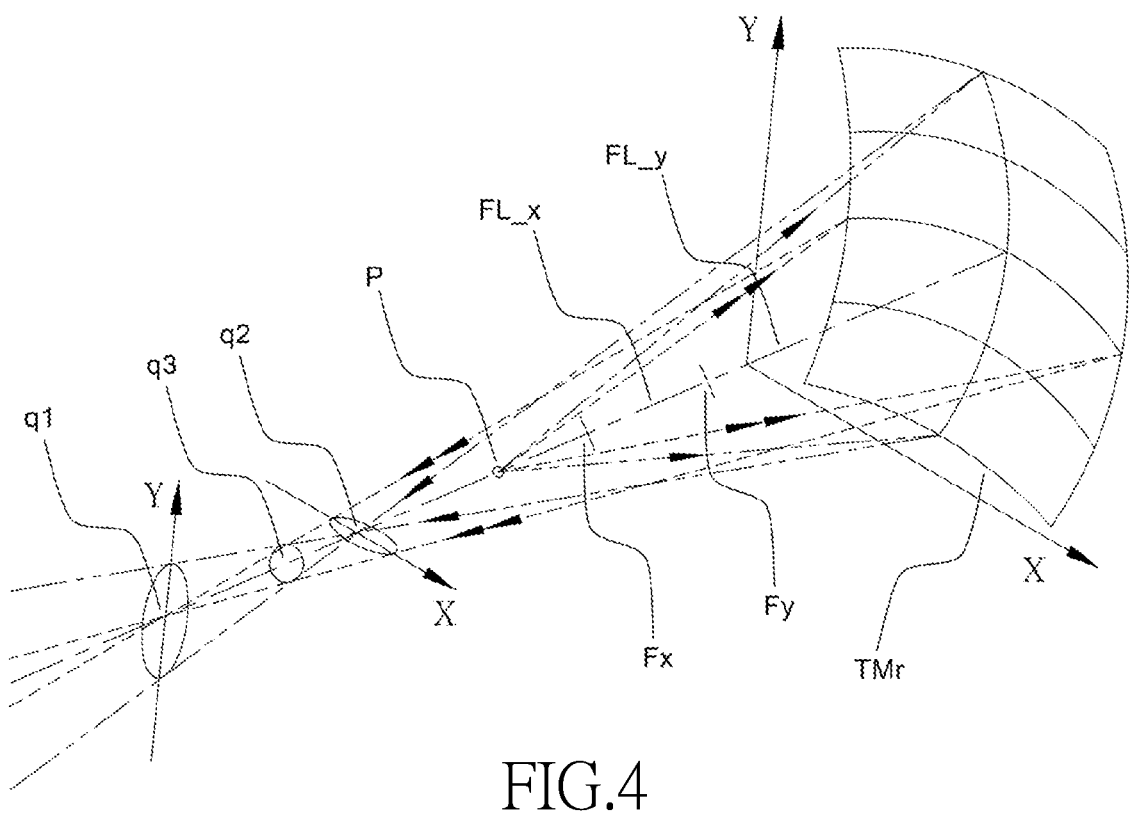
FIG. 4 is a schematic diagram of the real image imaging state when the point light source is on the central axis of the backlight Toroidal mirror and the object distance is greater than the focal length.

The situation where a point light source P forms a real image in front of the backlight Toroidal mirror TMr, as shown in FIG. 4, the point light source P is on the central axis CA of the backlight Toroidal mirror TMr, the focal length FL_x of the focal point Fx corresponding to the X-axis curvature is greater than the focal length FL_y of the focal point Fy corresponding to the Y-axis curvature, and a distance between the point light source P and the backlight Toroidal mirror TMr is greater than the focal length FL_x, and also greater than the focal length FL_y. Since the point light source P is closer to the focal point Fx and farther from the focal point Fy, the light emitted by the point light source P will be focused at the position q1 after being reflected by the surface with X-axis curvature on the backlight Toroidal mirror TMr, the light emitted by the point light source P will be focused at the position q2 after being reflected by the surface with Y-axis curvature on the backlight Toroidal mirror TMr, and the distance between the position q1 and the backlight Toroidal mirror TMr is greater than the distance between the position q2 and the backlight Toroidal mirror TMr.

The light reflected by the surface with X-axis curvature will pass through the position q2 and remain unfocused before reaching the position q1. After being focused at the position q2, the light reflected by the surface with Y-axis curvature will begin to diverge forward and then pass through the position q1, and the circle of least confusion is located at a position q3 between the positions q1 and q2. Therefore, the area with the highest brightness of the light on the central axis CA is located between the positions q1 and q2, and the brightness of the light decreases in other areas before and after this area.

Figure 5:
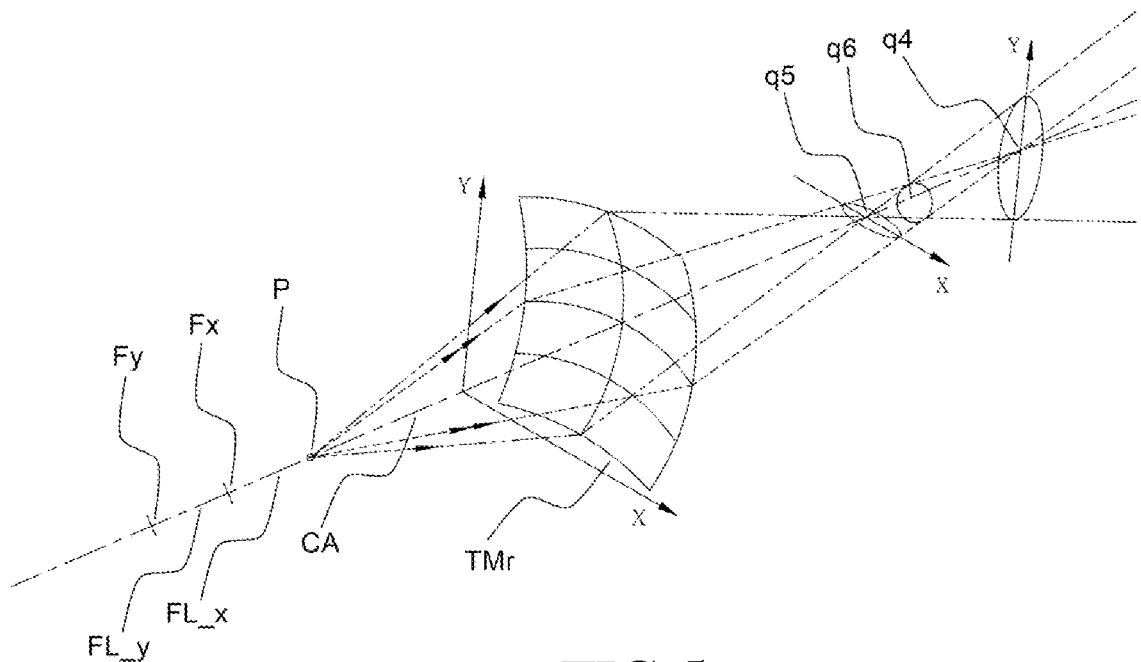
FIG. 5 is a schematic diagram of the virtual image imaging state when the point light source is on the central axis of the backlight Toroidal mirror and the object distance is less than the focal length.

The situation where the point light source P forms a virtual image behind the backlight Toroidal mirror TMr, as shown in FIG. 5, the point light source P is on the central axis CA of the backlight Toroidal mirror TMr, and the focal length FL_x of the focal point Fx is less than the focal length FL_y of the focal point Fy, the distance between the point light source P and the backlight Toroidal mirror TMr is less than the focal length FL_x, and also less than the focal length FL_y. Due to the fact that point light source P is closer to the focal point Fx and farther from the focal point Fy, the virtual image light generated by the backward extension of the light when the light emitted by the point light source P is reflected by the surface with X-axis curvature on the backlight Toroidal mirror TMr will be focused at a position q4, and the virtual image light generated by the backward extension of the light when the light emitted by the point light source P is reflected by the surface with Y-axis curvature on the backlight Toroidal mirror TMr will be focused at a position q5. The distance between the position q4 and the backlight Toroidal mirror TMr is greater than the distance between the position q5 and the backlight Toroidal mirror TMr.

The virtual image light generated by back extension of the light reflected by the surface with X-axis curvature is first focused at the position q4 from the far back, and then diverges forward to pass through the position q5. The virtual image light generated by backward extension of the light reflected by the surface with Y-axis curvature will pass through the position q4 and remain unfocused before focusing at the position q5 from the far back. The circle of least confusion is located at a position q6 between the positions q4 and q5, so the area with the highest brightness of the virtual image light on the central axis CA is in the area between the positions q4 and q5, and the brightness of the virtual image light decreases in other areas before and after this area.

Figure 6:
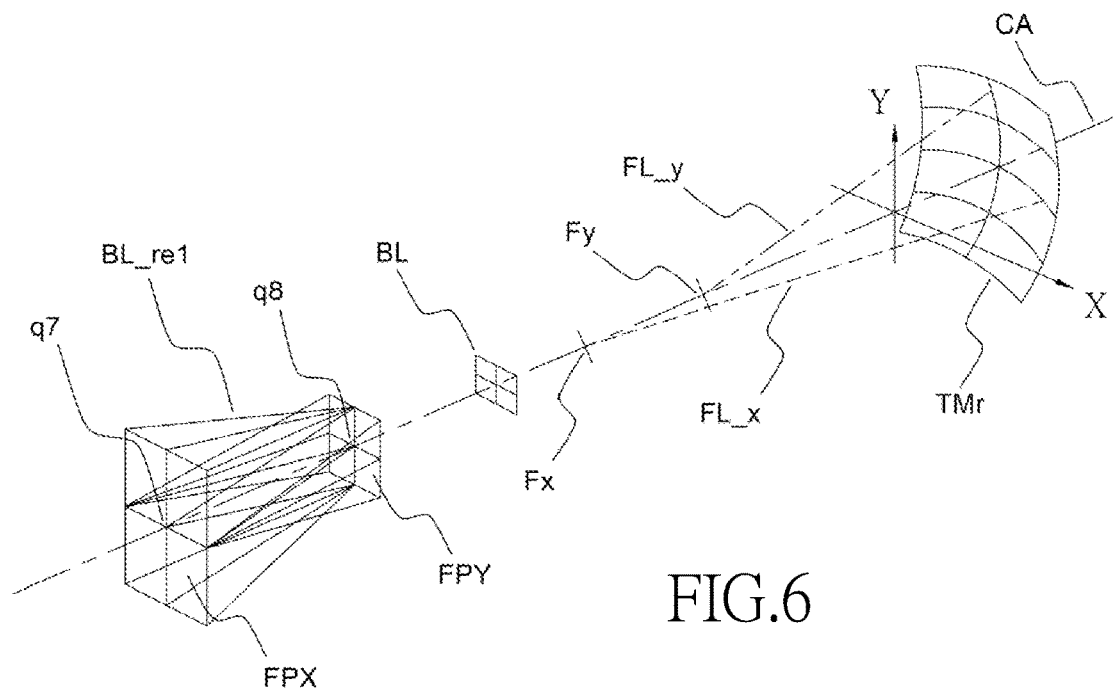
FIG. 6 is a schematic diagram of the real image imaging state when the rectangular light source is on the central axis of the backlight Toroidal mirror and the object distance is greater than the focal length.

The situation where the surface light source forms a real image in front of the backlight Toroidal mirror TMr, as shown in FIG. 6, the back light source BL which has a rectangular shape is on the central axis CA of the backlight Toroidal mirror TMr, and the focal length FL_x of the focal point Fx corresponding to the X-axis curvature is greater than the focal length FL_y of the focal point Fy corresponding to the Y-axis curvature, and the distance between the backlight source BL and the backlight Toroidal mirror TMr is greater than the focal length FL_x, and also greater than the focal length FL_y. Since the backlight source BL is closer to the focal point Fx and farther from the focal point Fy, the light emitted by the backlight source BL will be focused at a position q7 after being reflected by the surface with X-axis curvature on the backlight Toroidal mirror TMr, which is the X-axis backlight focusing plane FPX, the brightness in the axis X near the central axis CA is higher. The light emitted by the backlight source BL will be focused at a position q8 after being reflected by the surface with Y-axis curvature on the backlight Toroidal mirror TMr, which is the Y-axis backlight focusing plane FPY, the brightness is higher in the axis Y near the central axis CA. The distance between the position q7 and the backlight Toroidal mirror TMr is greater than the distance between the position q8 and the backlight Toroidal mirror TMr.

The light reflected by the surface with X-axis curvature will pass through the position q8 and remain unfocused before reaching the position q7. After the light reflected by the surface with Y-axis curvature is focused on position q8, it will diverge forward and pass through the position q7. Therefore, the area with the highest brightness of the light near the central axis CA is located between the positions q7 and q8. The brightness in the axis X near the central axis CA at the position q7 is higher, and the brightness in the axis Y near the central axis CA at the position q8 is higher. The brightness of the light decreases in other areas before and after the area between the positions q7 and q8.

Therefore, after the light emitted by the backlight source BL is reflected by the backlight Toroidal mirror TMr, a backlight real image BL_re1 with enlarged area and elongated range (depth) is formed in front of the backlight Toroidal mirror TMr.

Figure 7:
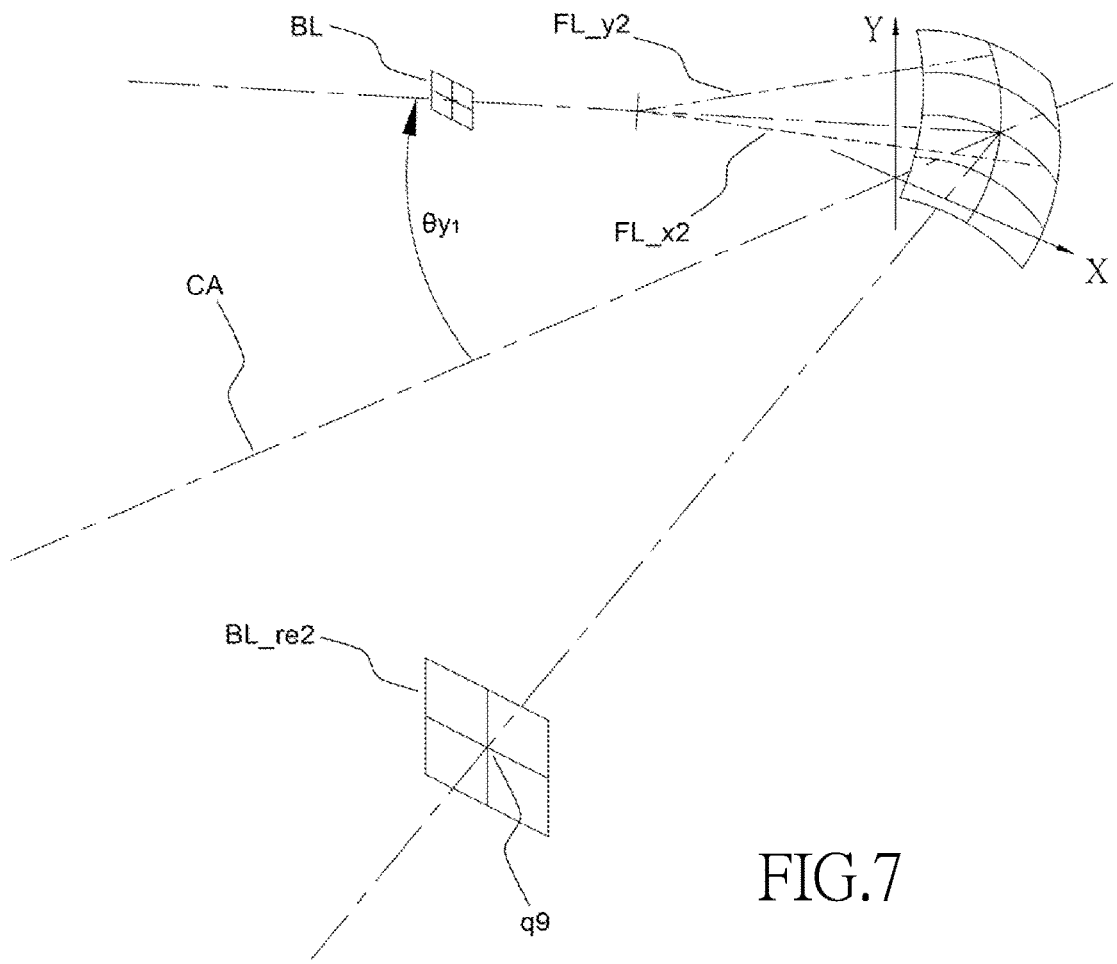
FIG. 7 is a schematic diagram of the real image imaging state when the rectangular light source deviates from the central axis of the backlight Toroidal mirror along the Y-axis and the object distance is greater than the equivalent focal length.

As shown in FIG. 7, when the backlight source BL of this rectangle shape rotates an angle θy1 (i.e. the angle between the optical axis of the backlight beam of the backlight source BL and the central axis CA of the backlight Toroidal mirror TMr in the axis Y is the included angle θy1) about the axis Y with the center of the backlight Toroidal mirror TMr as the pivot point, the equivalent focal length FL_x2 corresponding to the X-axis curvature is shortened to FL_x×cos θy1, and the equivalent focal length FL_y2 corresponding to the Y-axis curvature is elongated to FL_y/cos θ y1. If the focal lengths FL_x and FL_y and angle θ Y1 are adjusted appropriately, there is a chance that FL_x×cos θ y1 is almost equal to FL_y/cos θ y1. Under this condition, the light emitted by the backlight source BL will be focused at a position q9 after being reflected by the backlight Toroidal mirror TMr, forming a backlight real image BL_re2 with enlarged area, small volume and overall bright.

Figure 8:
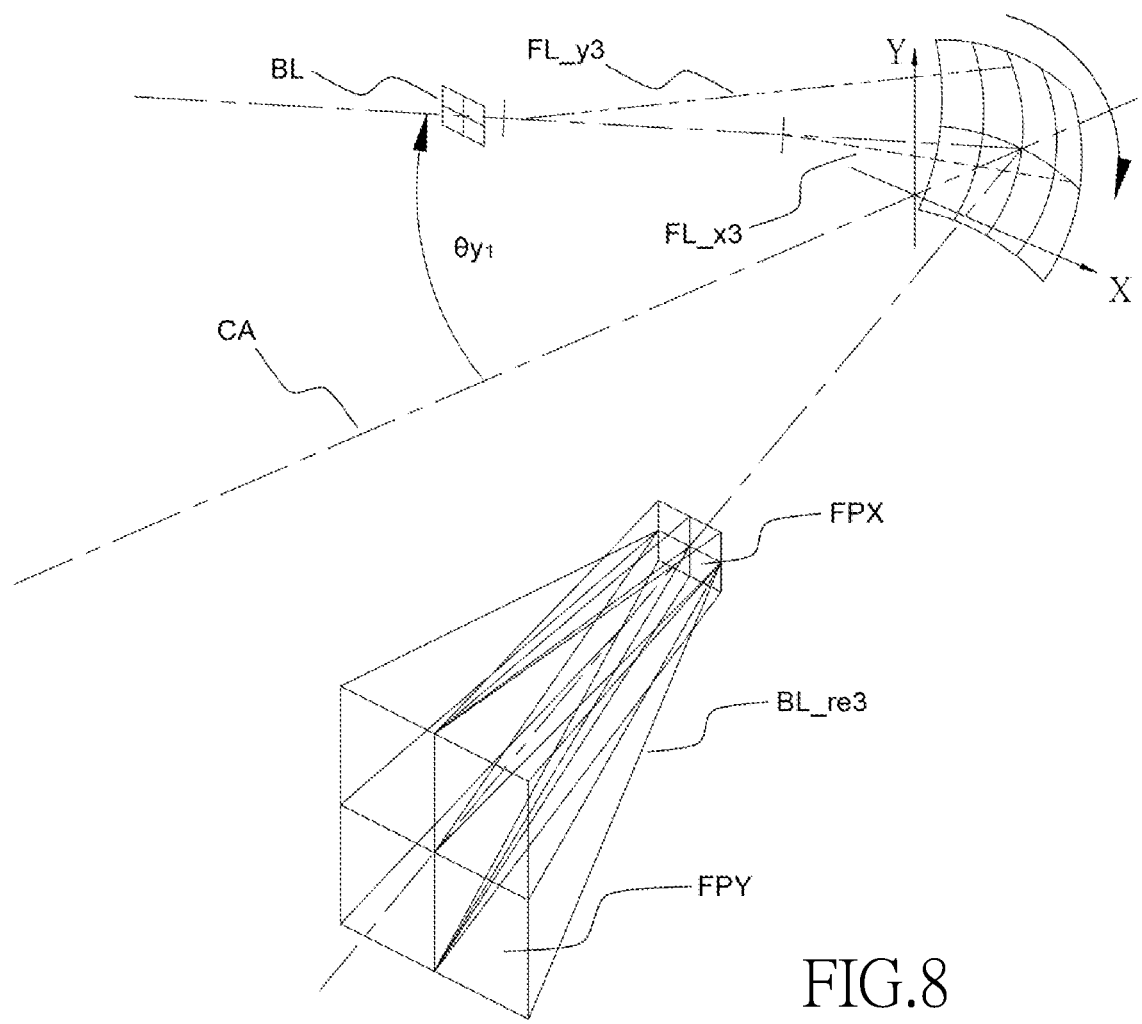
FIG. 8 is a schematic diagram of the real image imaging state by rotating the backlight Toroidal mirror of FIG. 7 by 90 degrees.

As shown in FIG. 8, when the backlight Toroidal mirror TMr in FIG. 7 rotates 90 degrees about its central axis CA, the equivalent focal length FL_x3 corresponding to the X-axis curvature is shortened to FL_y x cos θ y1, and the equivalent focal length FL_y3 corresponding to the Y-axis curvature is elongated to FL_x/cos θ y1, and FL_x/cos θy1>FL_x>FL_y>FL_y×cos θy1. Under this condition, the light emitted by the backlight source BL will be reflected by the backlight Toroidal mirror TMr and become a backlight real image BL_re3 with enlarged area and longer range, extending from the X-axis backlight focusing plane FPX to the Y-axis backlight focusing plane FPY.

Figure 9:
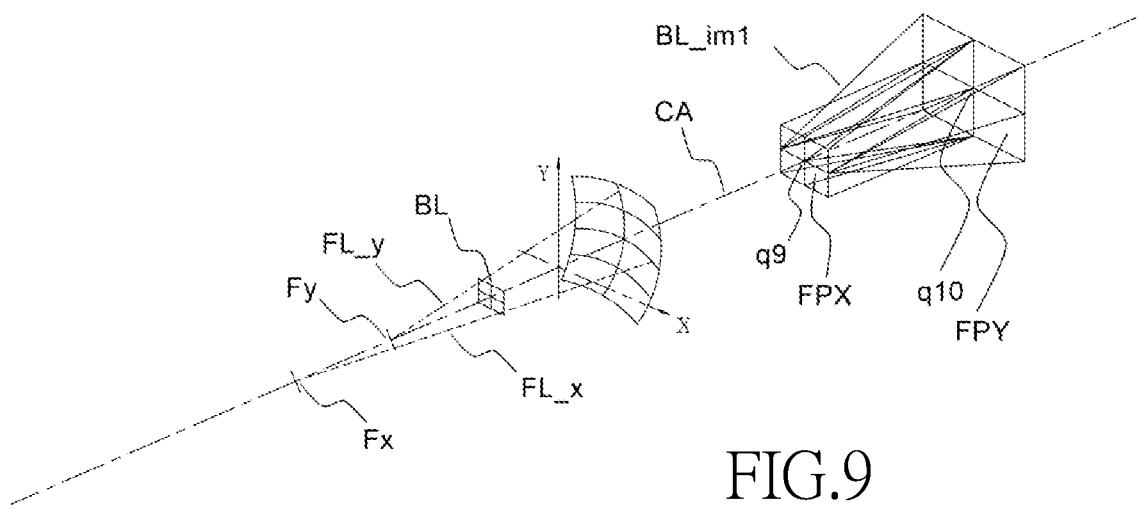
FIG. 9 is a schematic diagram of the virtual image imaging state when the rectangular light source is on the central axis of the backlight Toroidal mirror and the object distance is less than the focal length.

As shown in FIG. 9, the rectangular backlight source BL is located on the central axis CA of the backlight Toroidal mirror TMr, and the focal length FL_x of the focal point Fx corresponding to the X-axis curvature is greater than the focal length FL_y of the focal point Fy corresponding to a Y-axis curvature. The distance between the backlight source BL and the backlight Toroidal mirror TMr is less than the focal length FL_x, and also less than the focal length FL_y. Since the backlight source BL is farther from the focal point Fx and closer to the focal point Fy, the virtual image light generated by the backward extension of the light which is emitted by the backlight source BL and reflected by the surface with X-axis curvature on the backlight Toroidal mirror TMr will be focused at a position q9, and the brightness in the axis X near the central axis CA is higher; the virtual image light generated by the backward extension of the light which is emitted by the backlight source BL and reflected by the surface with Y-axis curvature on the backlight Toroidal mirror TMr will be focused at a position q10, and the brightness in the axis Y near the central axis CA is higher. The distance between the position q9 and the backlight Toroidal mirror TMr is smaller than the distance between the position q10 and the backlight Toroidal mirror TMr.

The virtual image light generated by backward extension of the light reflected from the surface with X-axis curvature will pass through the position q10 and remain unfocused before being focused at the position q9 from the far back. After being focused at the position q10 from the far back, the virtual image light generated by backward extension of the light reflected from the surface with Y-axis curvature will diverge forward and pass through the position q9. The area with the highest brightness of the light on the central axis CA is located between the positions q9 and q10. The brightness in the X axis near the central axis CA at the position q9 is higher, and the brightness in the Y axis near the central axis CA at the position q10 is higher. The brightness of the light decreases in other areas before and after the area between the positions q9 and 10.

Therefore, after the light emitted by the backlight source BL is reflected by the backlight Toroidal mirror TMr, a backlight virtual image BL_im1 with enlarged area and elongated range will be formed behind the backlight Toroidal mirror TMr, and extend from the X-axis backlight focusing plane FPX to the Y-axis backlight focusing plane FPY.

Figure 10:
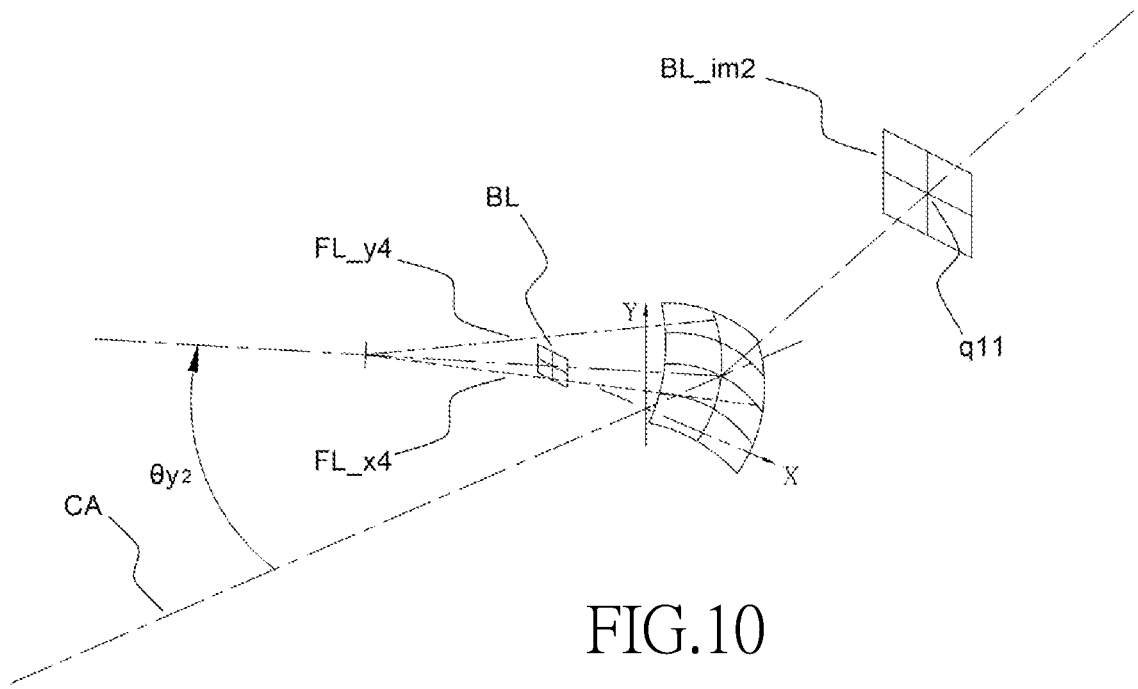
FIG. 10 is a schematic diagram of the virtual image imaging state when a rectangular light source deviates from the central axis of the backlight Toroidal mirror along the Y-axis and the object distance is less than the equivalent focal length.

As shown in FIG. 10, the rectangular backlight source BL rotates an angle θy2 about the axis Y with the center of the backlight Toroidal mirror TMr as the pivot point, the equivalent focal length FL_x4 corresponding to the X-axis curvature is shortened to FL_x×Cos θ, and the equivalent focal length FL_y4 corresponding to the Y-axis curvature is elongated to FL_y/cos θ y2. If the focal lengths FL_x and FL_y and the angle θ y2 are adjusted appropriately, there is a chance that FL_x×cos θy2 is almost equal to FL_y/cos θy2. Under this condition, the light emitted by the backlight source BL will focus at the position q11 after being reflected by the backlight Toroidal mirror TMr, forming a virtual image BL_im2 with enlarged area, small volume and overall bright.

Figure 11:
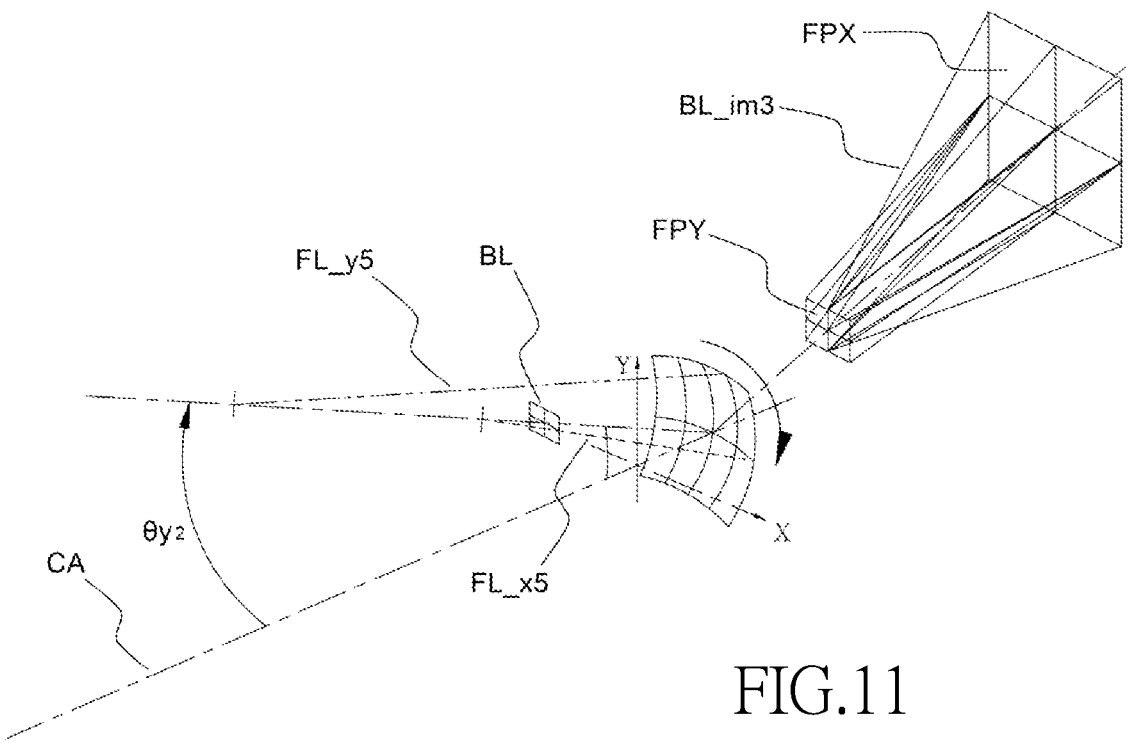
FIG. 11 is a schematic diagram of the virtual image imaging state when the backlight Toroidal mirror in FIG. 10 is rotated by 90 degrees.

As shown in FIG. 11, the backlight Toroidal mirror TMr shown in FIG. 10 rotates 90 degrees about its central axis CA, at this point, the equivalent focal length FL_x5 corresponding to the X-axis curvature is shortened to FL_y×Cos θy2, the equivalent focal length FL_y5 corresponding to the Y-axis curvature is elongated to FL_x/cos θ y2, and FL_x/cos θ y2>FL_x>FL_y>FL_y×Cos θ y2. Under this condition, the light emitted by the backlight source BL is reflected by the backlight Toroidal mirror TMr and becomes a backlight virtual image BL_im3 with an enlarged area and a longer range, extending from the X-axis backlight focusing plane FPX to the Y-axis backlight focusing plane FPY.

FIG. 12 is a table which shows that under the condition that the X-axis curvature of the backlight Toroidal mirror is greater than the Y-axis curvature, or the X-axis curvature is less than the Y-axis curvature, when the off-axis direction is the axis X or the off-axis direction is the axis Y, if the rotation angle is from 0 degree to 90 degrees, or the rotation angle is from 90 degrees to 0 degree, the change of the backlight real image is elongated or shortened.

Figure 13A:
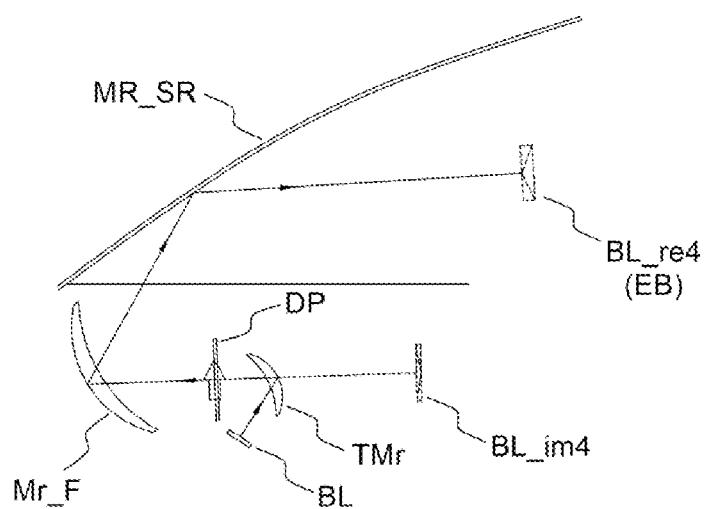
FIGS. 13A and 13B are schematic diagrams of the eye box presented when the backlight Toroidal mirror has not yet rotated.

From the above results, it can be seen that if the equivalent focal lengths of the backlight Toroidal mirror TMr in the axes X and Y are almost equal, as shown in FIG. 13A, the light emitted by the backlight source BL will be focused into an enlarged area, small volume, and overall bright backlight virtual image BL_im4 after being reflected by the backlight Toroidal mirror TMr, and the backlight virtual image BL_im4 is then reflected by the imaging concave mirror Mr_F and imaging semi-reflector Mr_SR and then forms a small volume and overall bright backlight real image BL_re4, namely, the eye box EB.

Figure 13B:
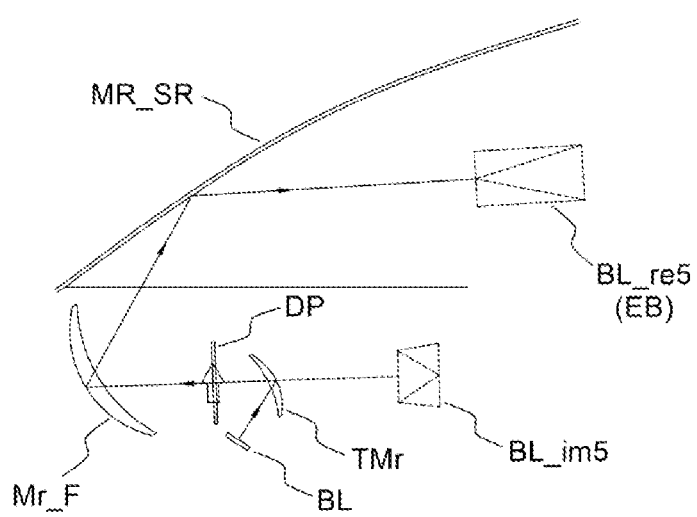

If there is a difference in the equivalent focal lengths of the backlight Toroidal mirror TMr between the axes X and Y, as shown in FIG. 13B, the backlight source BL emitted light reflected by the backlight Toroidal mirror TMr forms a large area, relatively large volume and bright backlight virtual image BL_im5, and the backlight virtual image BL_im5 is then reflected by the imaging concave mirror Mr_F and the imaging semi-reflector Mr_SR and then forms a slightly longer and bright backlight real image BL_re5, namely, the eye box EB.

Figure 13C:
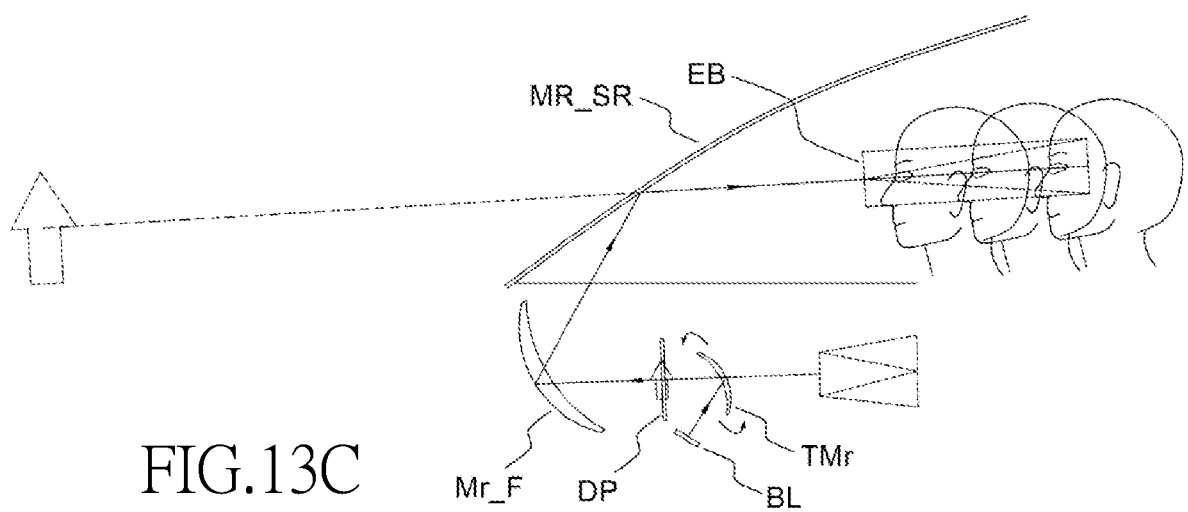
FIG. 13C is a schematic diagram of rotating the backlight Toroidal mirror to elongate the eye box when the viewer moves back and forth.

When using a head up display, when the viewer's eyes move back and forth, the eye boxes EB in FIGS. 13A and 13B will not overlap with the moved eyes, making the image seen by the viewer dim and blurry. At this point, the backlight Toroidal mirror TMr can be rotated 90 degrees around its central axis CA, as shown in FIG. 13C, to elongate the eye box EB forward and backward, so that the eye box EB can still cover the viewer's moved eyes, and the viewer can see a bright and clear image.

The following is an exemplary explanation of the range of adjustment of the eye box EB by the backlight Toroidal mirror TMr of the head up display.

Example 1

Figure 14A:
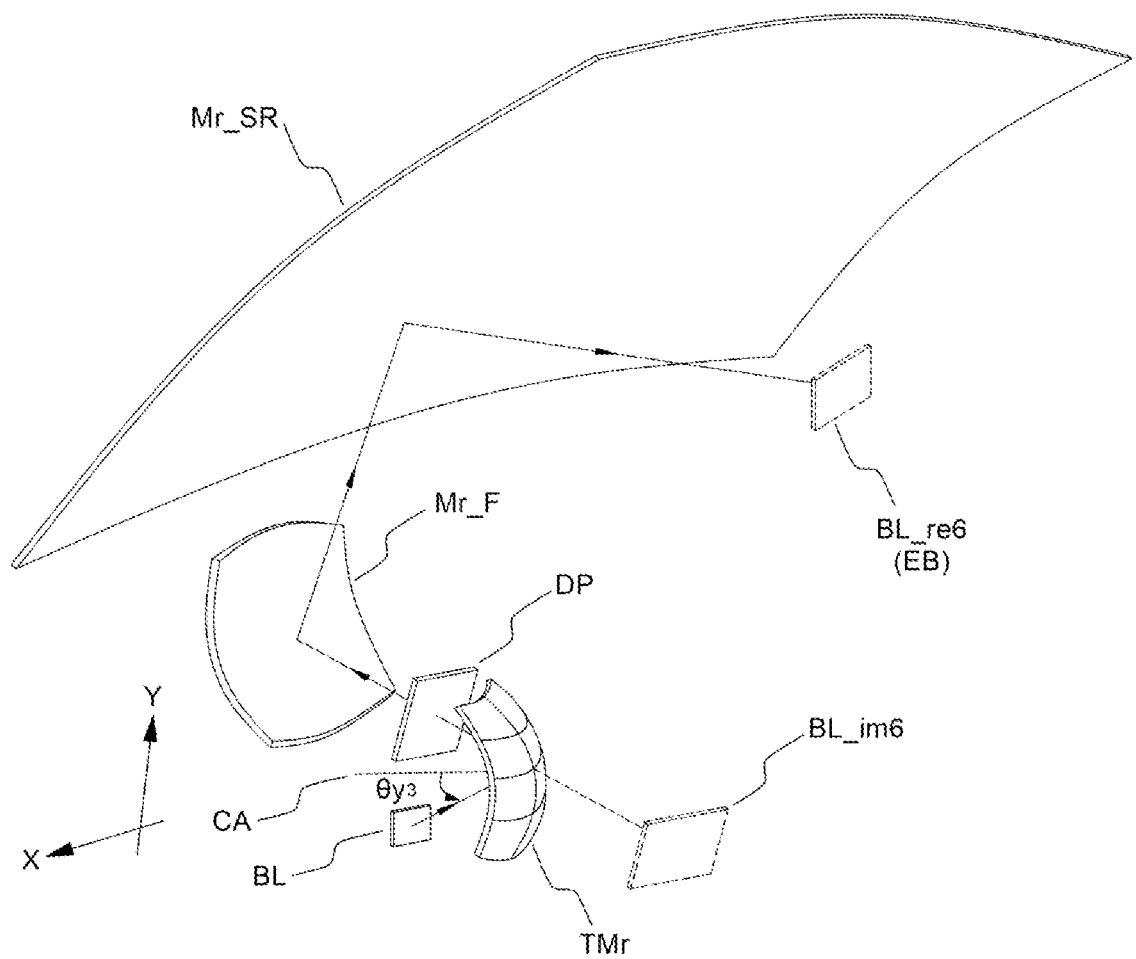
FIG. 14A is a schematic diagram of a smaller eye box formed when the backlight is set in the off axis direction of the axis Y of the backlight Toroidal mirror.

As shown in FIG. 14A, the Y-axis curvature of the backlight Toroidal mirror TMr is greater than the X-axis curvature, resulting in the Y-axis focal length less than the X-axis one; The backlight source BL deviates downwards by an angle $\theta$ y3 along the axis Y from the central axis CA of the backlight Toroidal mirror TMr. Under this condition, the backlight beam forms a backlight virtual image BL_im6 with enlarged area, small volume and overall bright, behind the backlight Toroidal mirror TMr.

The light emitted by the backlight virtual image BL_im6 passes through the display panel DP and then reflected by the imaging concave mirror Mr_F and the imaging semi-reflector Mr_SR and then forms a small volume but overall bright backlight real image BL_re6, namely, the eye box EB. At this point, the viewer's eyes overlap with the eye box EB.

Figure 14B:
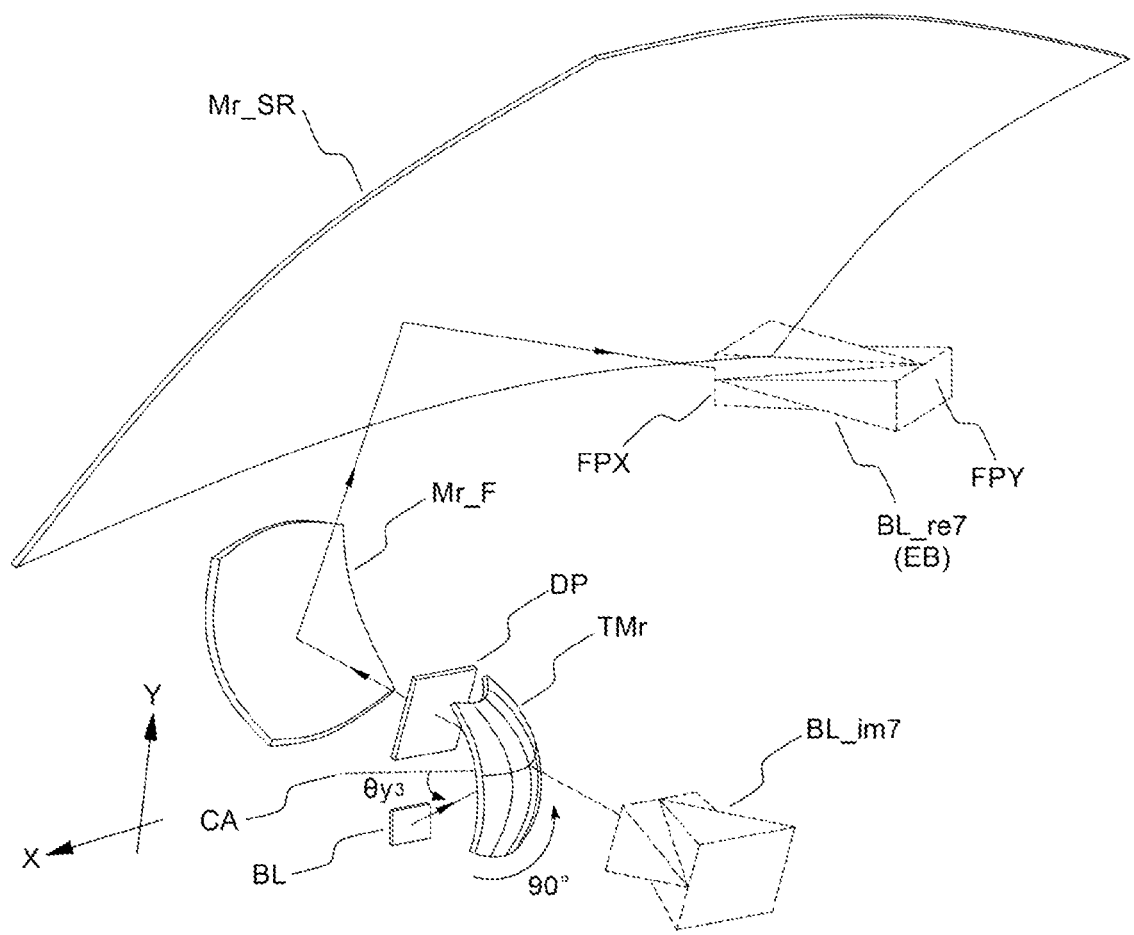
FIG. 14B is a schematic diagram of the elongated eye box formed by rotating the backlight Toroidal mirror of FIG. 14A by 90 degrees.

As shown in FIG. 14B, the backlight Toroidal mirror TMr in FIG. 14A rotates 90 degrees around its central axis CA, and the backlight beam of the backlight source BL will form a backlight virtual image BL_im7 with elongated range, behind the backlight Toroidal mirror TMr.

After passing through the display panel DP, the light emitted by the backlight virtual image BL_im7 will be reflected by the imaging concave mirror Mr_F and the imaging semi-reflector Mr_SR and then forms a backlight real image BL_re7 with elongated range, namely, an eye box EB which is elongated forward and backward. The range of this eye box EB is from the X-axis backlight focusing plane FPX to the Y-axis backlight focusing plane FPY, which can keep the viewer's eyes inside the eye box EB while moving them back and forth.

Although the brightness of this elongated eye box EB is dispersed within the elongated range, as long as the brightness of the backlight source is increased, the image seen by the viewer within this elongated eye box range can still remain bright and clear.

Example 2

Figure 15A:
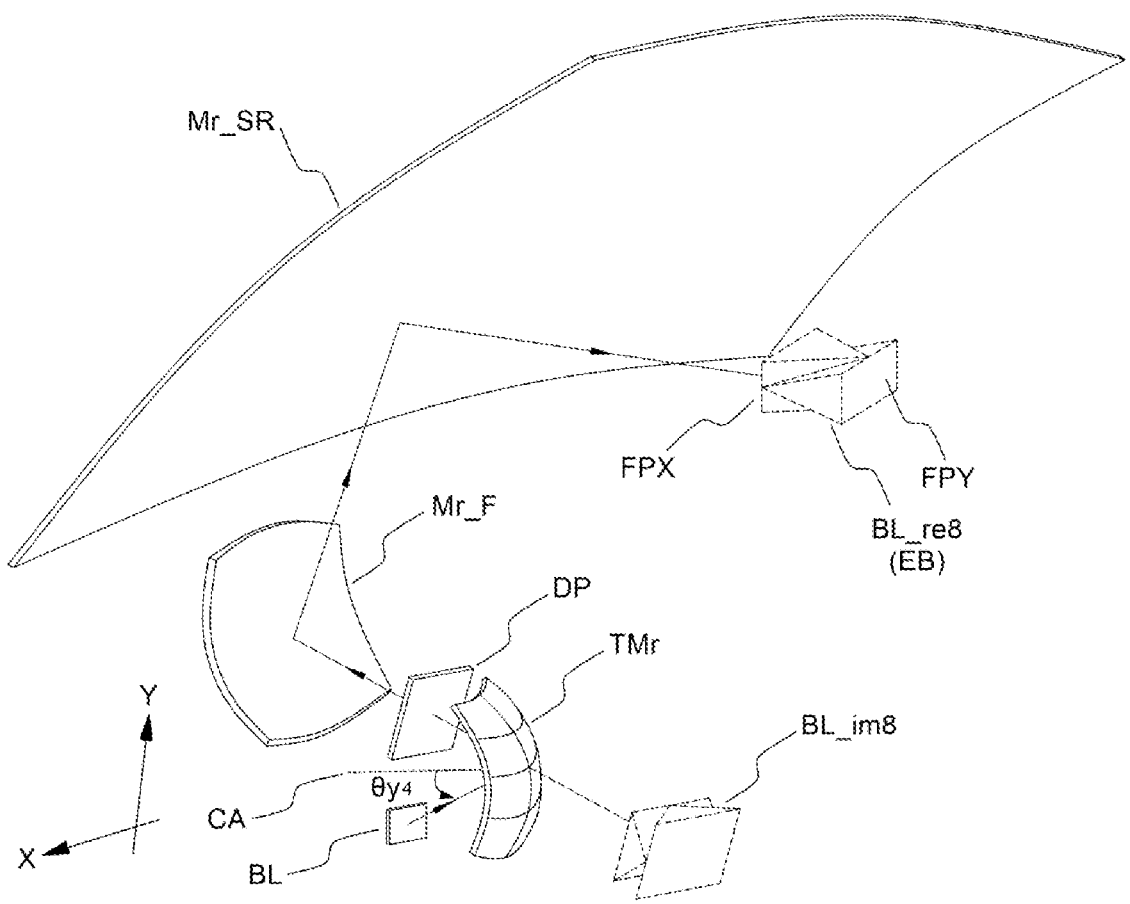
FIG. 15A is a schematic diagram of a slightly larger eye box formed when the backlight is set in the off axis direction of the axis Y of the backlight Toroidal mirror.

As shown in FIG. 15A, the Y-axis curvature of the backlight Toroidal mirror TMr is greater than the X-axis curvature, resulting in its Y-axis focal length being smaller than the X-axis focal length; The backlight source BL deviates downward by an angle $\theta$ y4 along the axis Y from the central axis CA of the backlight Toroidal mirror TMr. Under this condition, the backlight beam forms a backlight virtual image BL_im8 with enlarged area, relatively large volume and being overall bright, behind the backlight Toroidal mirror TMr.

After passing through the display panel DP, the light emitted by the backlight virtual image BL_im8 will be reflected by the imaging concave mirror Mr_F and the imaging semi-reflector Mr_SR and then forms a backlight real image BL_re8 which has a slightly longer range and is overall bright, namely the eye box EB. The range of this eye box EB is from the X-axis backlight focusing plane FPX to the Y-axis backlight focusing plane FPY, where the viewer's eyes are inside the eye box EB.

Figure 15B:
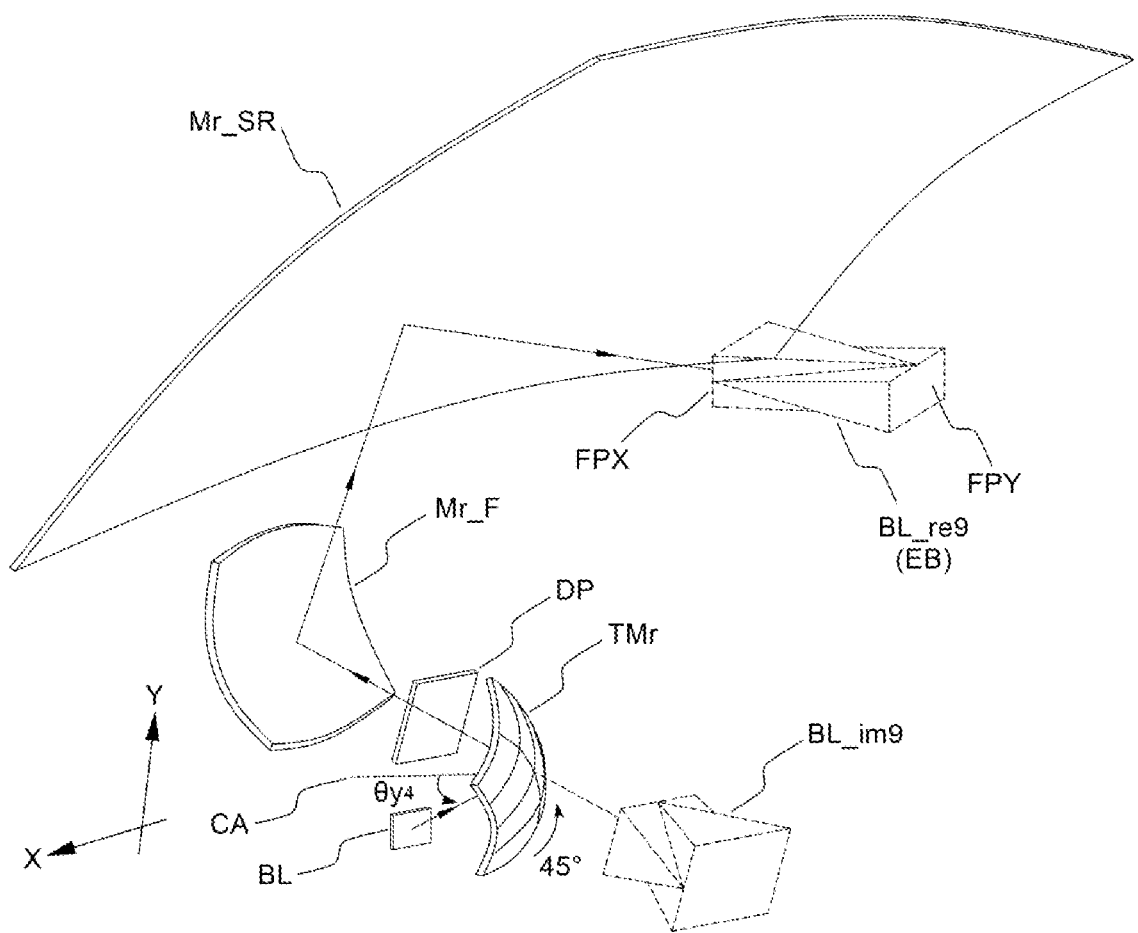
FIG. 15B is a schematic diagram of the elongated eye box formed when the backlight Toroidal mirror of FIG. 15A is rotated 45 degrees.

As shown in FIG. 15B, the backlight Toroidal mirror TMr in FIG. 15A rotates 45 degrees around its central axis CA, and the backlight beam of the backlight source BL will form a stretched backlight virtual image BL_im9 with elongated range, behind the backlight Toroidal mirror TMr.

After passing through the display panel DP, the light emitted by the backlight virtual image BL_im9 will be reflected by the imaging concave mirror Mr_F and the imaging semi-reflector Mr_SR and then forms a backlight real image BL_re9 which is elongated forward and backward, namely an elongated eye box EB, The range of this eye box EB is from the X-axis backlight focusing plane FPX to the Y-axis backlight focusing plane FPY, which can keep the viewer's eyes inside the eye box EB while moving them back and forth.

Figure 15C:
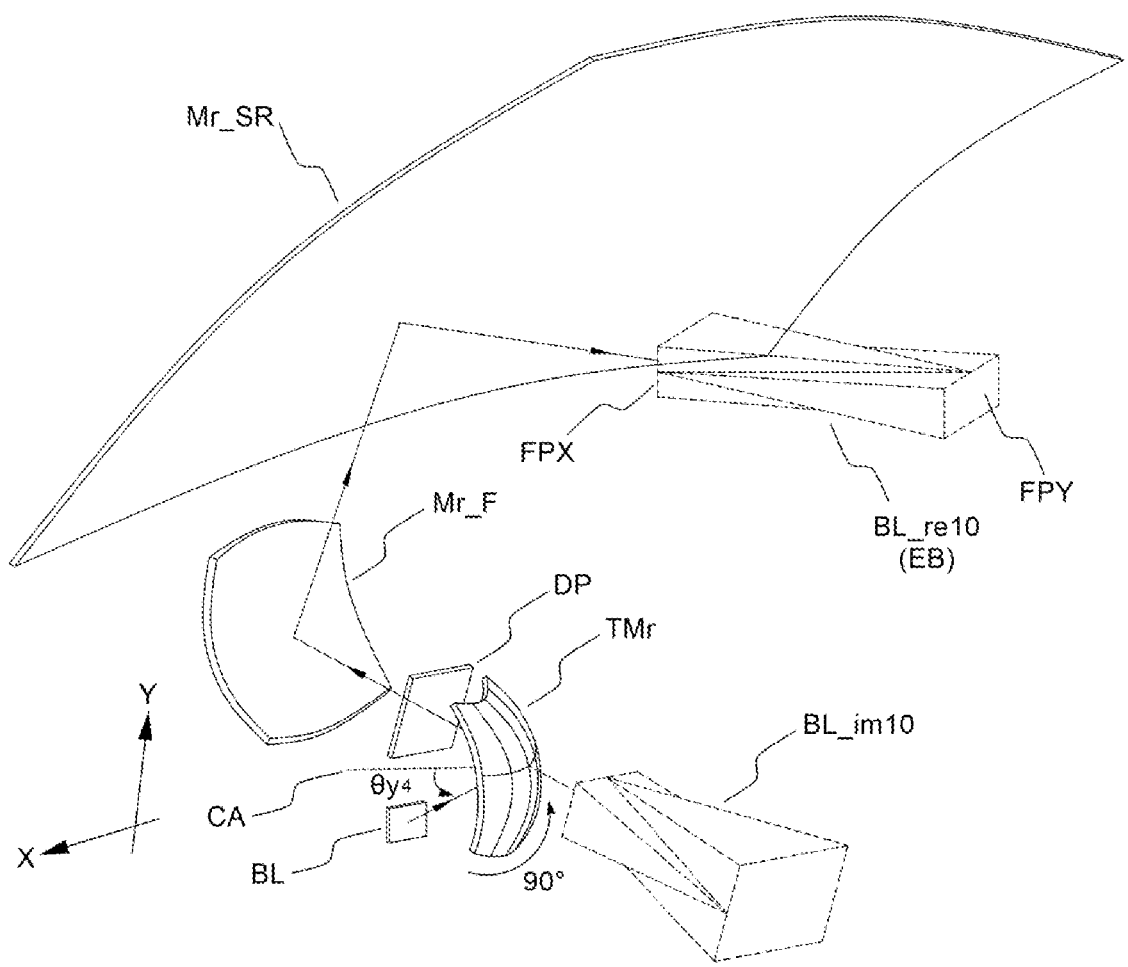
FIG. 15C is a schematic diagram of the elongated eye box formed when the backlight Toroidal mirror of FIG. 15A is rotated 90 degrees.

As shown in FIG. 15C, the backlight Toroidal mirror TMr in FIG. 15A rotates 90 degrees around its central axis CA, and the backlight beam of the backlight source BL will form a backlight virtual image BL_im10 with a relatively longer range, behind the backlight Toroidal mirror TMr.

After passing through the display panel DP, the light emitted by the backlight virtual image BL_im10 will be reflected by the imaging concave mirror Mr_F and the imaging semi-reflector Mr_SR and then forms a backlight real image BL_re10 with elongated range, namely an eye box EB which is elongated forward and backward. The range of this eye box EB is from the X-axis backlight focusing plane FPX to the Y-axis backlight focusing plane FPY, which can keep the viewer's eyes inside the eye box EB even when the back-and-forth movement distance of the viewer's eyes is relatively long.

Although the brightness of this more elongated eye box EB is dispersed to a longer range, as long as the brightness of the backlight source BL is increased, the image seen by the viewer within this elongated eye box EB can still remain bright and clear.

Example 3

Figure 16A:
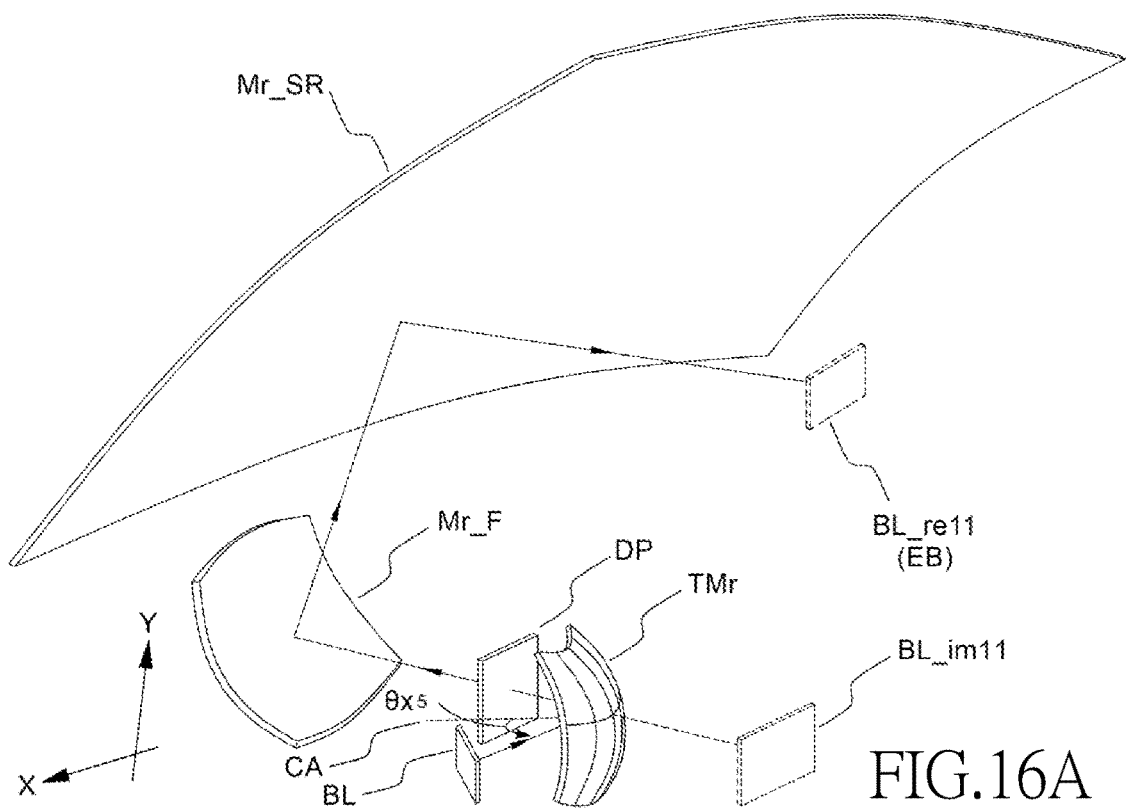
FIG. 16A is a schematic diagram of a smaller eye box formed when the backlight is set in the off axis direction of the axis X of the backlight Toroidal mirror.

As shown in FIG. 16A, the X-axis curvature of the backlight Toroidal mirror TMr is greater than the Y-axis curvature, resulting in the X-axis focal length being less than the Y-axis one; The backlight source BL deviates rightward an angle $\theta$ x5 along the axis X from the central axis CA of the backlight Toroidal mirror TMr. Under this condition, the backlight beam forms an area enlarged, shallow range, and overall bright backlight virtual image BL_im11 behind the backlight Toroidal mirror TMr.

After passing through the display panel DP, the light emitted by the backlight virtual image BL_im11 will be reflected by the imaging concave mirror Mr_F and the imaging semi-reflector Mr_SR and then forms a shallow range and overall bright backlight real image BL_re11, namely the eye box EB. At this point, the viewer's eyes overlap with the eye box EB.

Figure 16B:
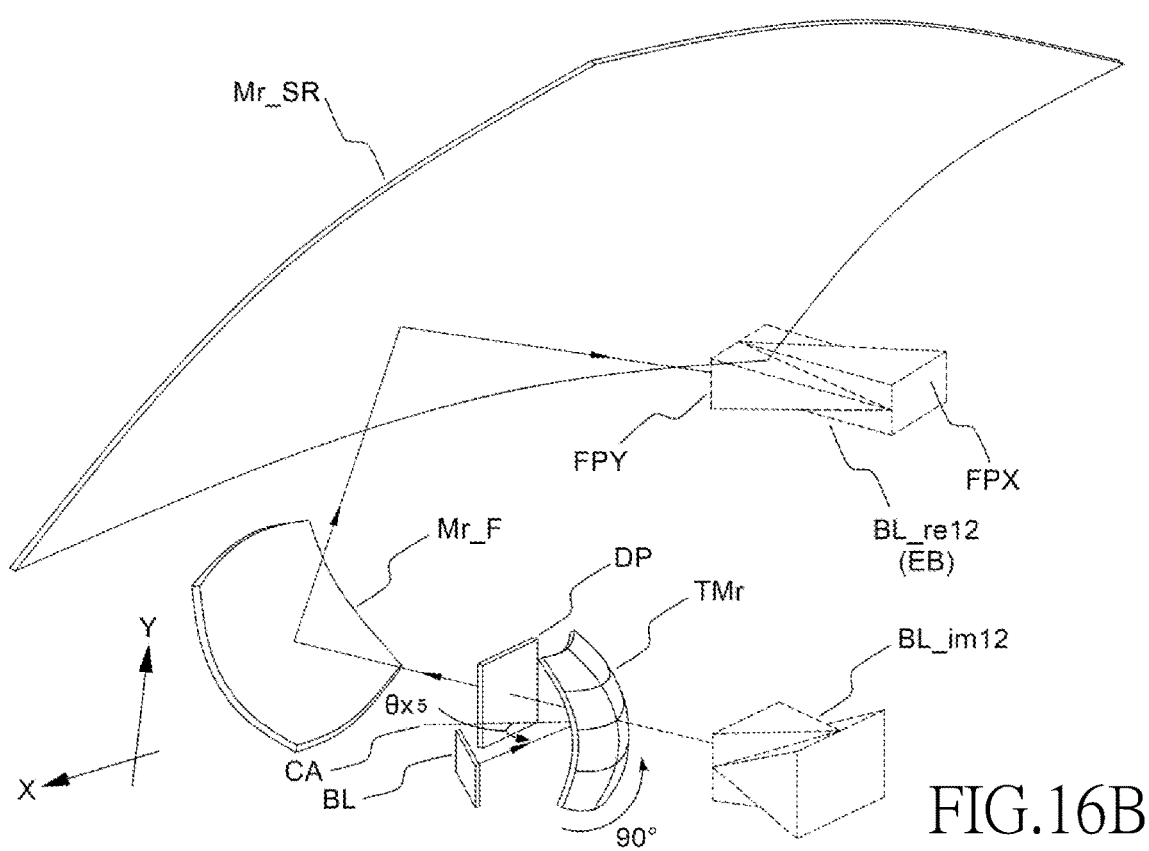
FIG. 16B is a schematic diagram of the elongated eye box formed when the backlight Toroidal mirror of FIG. 16A is rotated 90 degrees.

As shown in FIG. 16B, the backlight Toroidal mirror TMr in FIG. 16A rotates 90 degrees about its central axis CA, and the backlight beam of the backlight source BL will form a stretched virtual image BL_im12 of the backlight (with engaged range) behind the backlight Toroidal mirror TMr.

After passing through the display panel DP, the light emitted by the backlight virtual image BL_im12 will be reflected by the imaging concave mirror Mr_F and the imaging semi-reflector Mr_SR and then forms a stretched backlight real image BL_re12 with elongated range, namely an elongated eye box EB. The range of this eye box EB is from the X-axis backlight focusing plane FPX to the Y-axis backlight focusing plane FPY, which can keep the viewer's eyes inside the eye box EB while moving them back and forth.

Although the brightness of this elongated eye box EB is dispersed within the elongated range, as long as the brightness of the backlight source BL is increased, the image seen by the viewer in this elongated eye box EB can still remain bright and clear.

Example 4

Figure 17A:
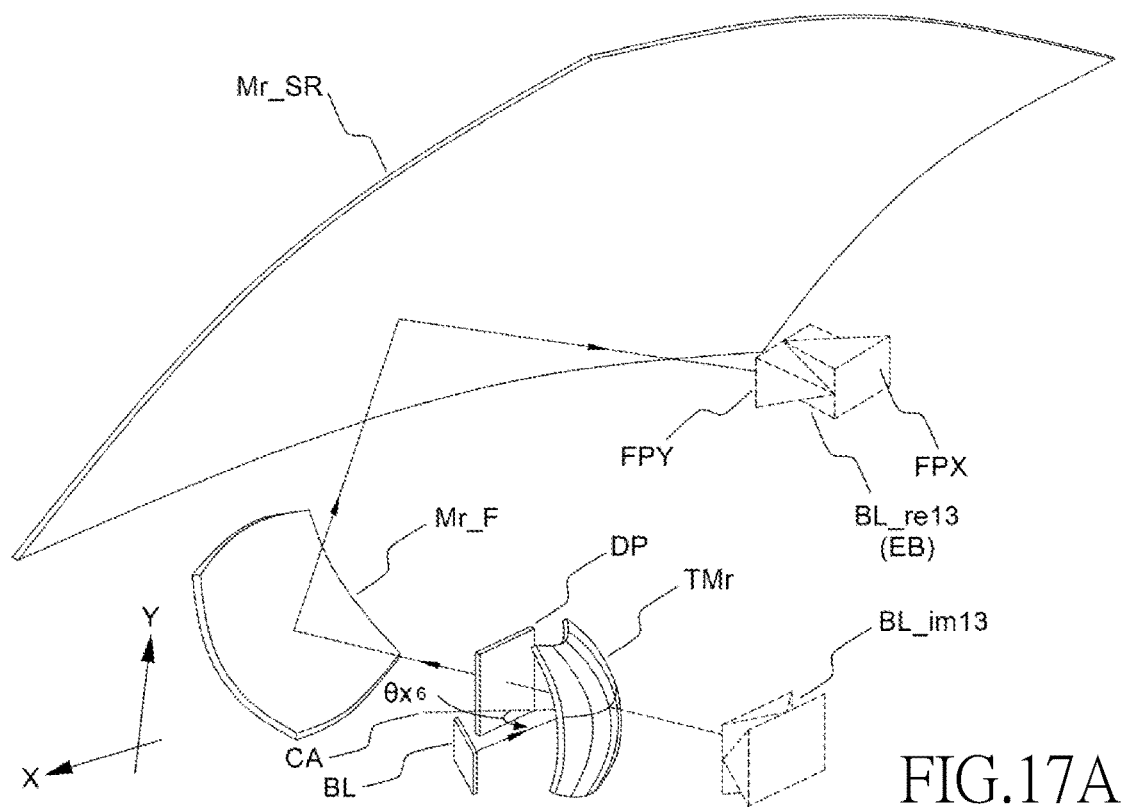
FIG. 17A is a schematic diagram of a slightly larger eye box formed when the backlight is set in the off axis direction of the axis X of the backlight Toroidal mirror.

As shown in FIG. 17A, the X-axis curvature of the backlight Toroidal mirror TMr is greater than the Y-axis curvature, resulting in the X-axis focal length being less than the Y-axis one; The backlight source BL deviates rightward an angle θ x6 along the axis X from the central axis CA of the backlight Toroidal mirror TMr. Under this condition, the backlight beam forms an enlarged area, slightly longer range, and bright backlight virtual image BL_im13 behind the backlight Toroidal mirror TMr.

After passing through the display panel DP, the light emitted by the backlight virtual image BL_im13 will be reflected by the imaging concave mirror Mr_F and the imaging semi-reflector Mr_SR and then forms a backlight real image BL_re13 with relatively elongated range and overall bright, namely the eye box EB. The range of this eye box EB is from the X-axis backlight focusing plane FPX to the Y-axis backlight focusing plane FPY. At this point, the viewer's eyes are inside the eye box EB.

Figure 17B:
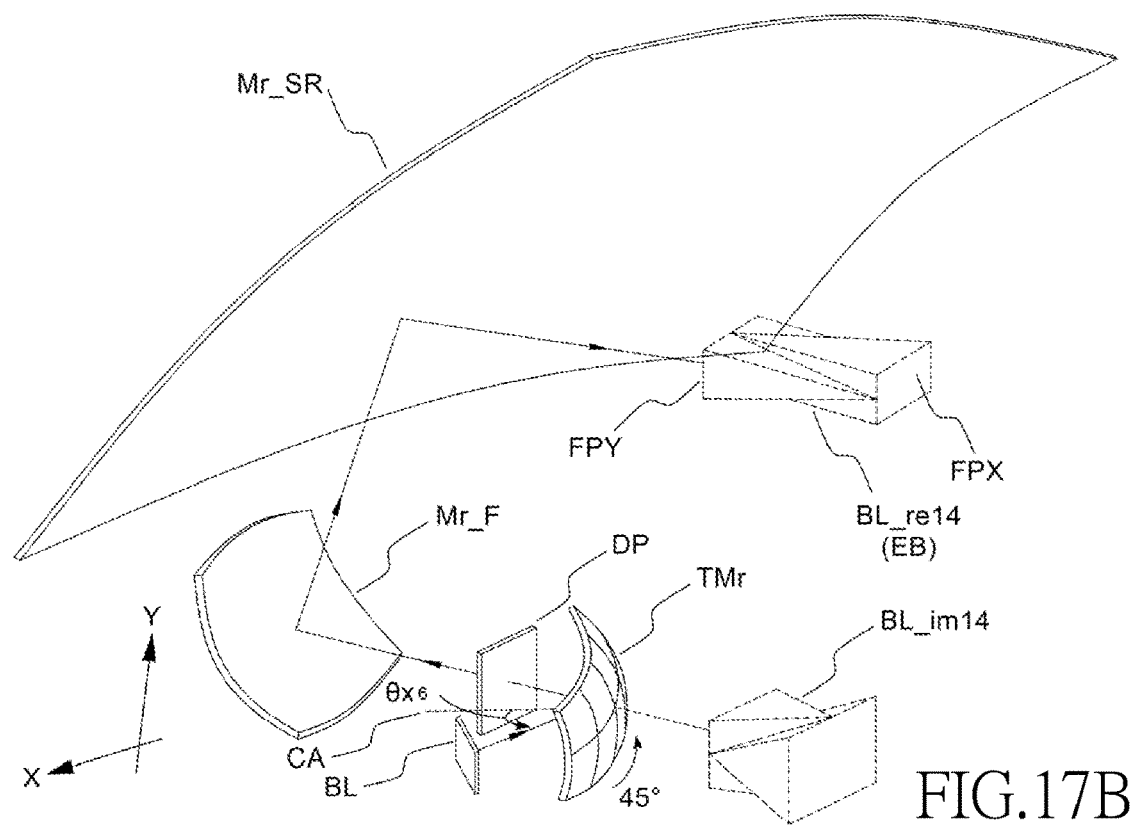
FIG. 17B is a schematic diagram of the elongated eye box formed when the backlight Toroidal mirror in FIG. 17A is rotated 45 degrees.

As shown in FIG. 17B, the backlight Toroidal mirror TMr in FIG. 17A rotates 45 degrees around its central axis CA, and the backlight beam of the backlight source BL_im14 will form a stretched backlight virtual image BL with elongated range behind the backlight Toroidal mirror TMr.

After passing through the display panel DP, the light emitted by the backlight virtual image BL_im14 will be reflected by the imaging concave mirror Mr_F and the imaging semi-reflector Mr_SR and then forms a stretched backlight real image BL_re14 with elongated range, namely an elongated eye box EB. The range of this eye box EB is from the X-axis backlight focusing plane FPX to the Y-axis backlight focusing plane FPY, which can keep the viewer's eyes inside the eye box EB even when the back-and-forth movement distance of the viewer's eyes is relatively short.

Figure 17C:
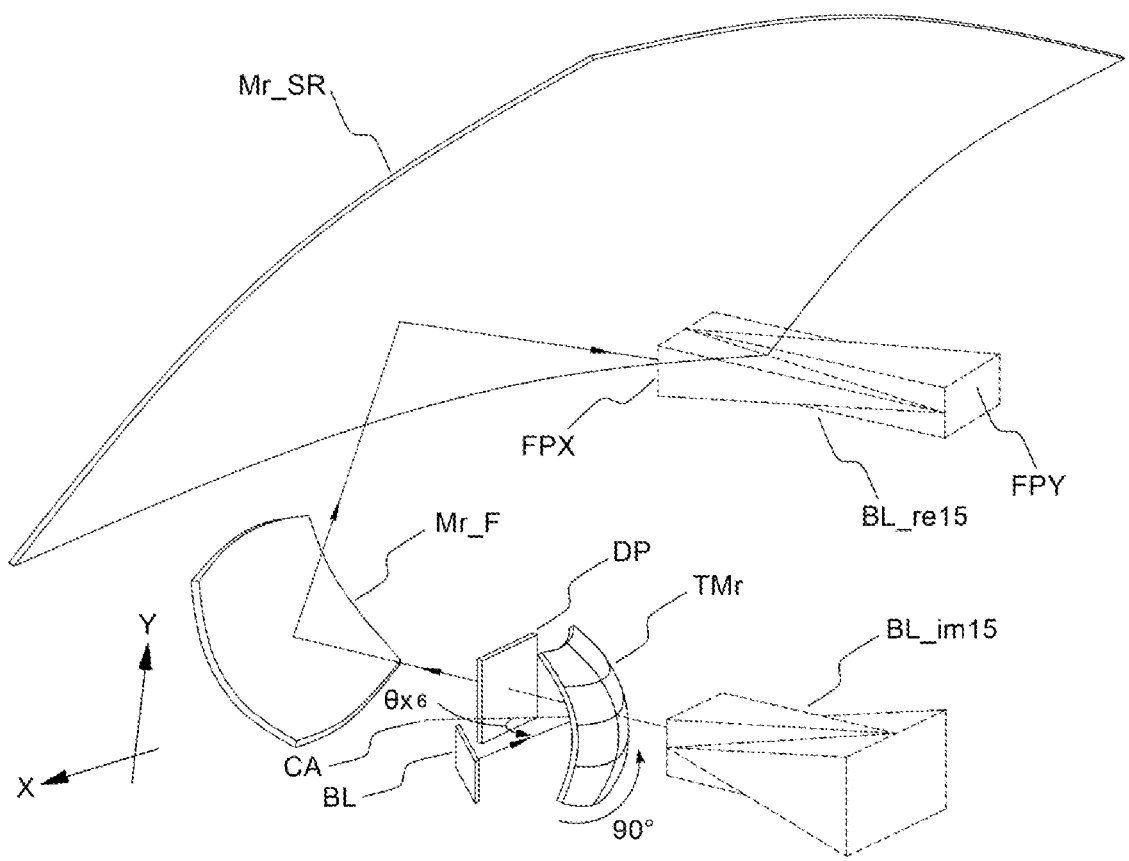
FIG. 17C is a schematic diagram of the elongated eye box formed when the backlight Toroidal mirror of FIG. 17A is rotated 90 degrees.

As shown in FIG. 17C, the backlight Toroidal mirror TMr in FIG. 17A rotates 90 degrees about its central axis CA, and the backlight beam of backlight source BL will form a backlight virtual image BL_im15 with a relatively longer range, behind the backlight Toroidal mirror TMr.

After passing through the display panel DP, the light emitted by the backlight virtual image BL_im15 will be reflected by the imaging concave mirror Mr_F and the imaging semi-reflector Mr_SR and then forms a stretched backlight real image BL_re15 with elongated range, namely the eye box EB which is elongated forward and backward. The range of this eye box EB is from the X-axis backlight focusing plane FPX to the Y-axis backlight focusing plane FPY, which can keep the viewer's eyes inside the eye box EB even when the back-and-forth movement distance of the viewer's eyes is relatively long.

Although the brightness of this elongated eye box EB is dispersed to a longer range, as long as the brightness of the backlight source BL is increased, the image seen by the viewer in this elongated eye box EB can still remain bright and clear.

In the state shown in FIG. 17C, if the backlight Toroidal mirror TMr is rotated 45 degrees in reverse about its central axis CA, the eye box EB will be shortened back to the slightly shorter range state in FIG. 17B from the longer range state.

In the state shown in FIG. 17C, if the backlight Toroidal mirror TMr is rotated 90 degrees in reverse about its central axis CA, the eye box EB will be shortened back to the shorter range state shown in FIG. 17A from the longer range state.

In the present invention, the in-situ rotation angle of the backlight Toroidal mirror TMr can be either 45 degrees or 90 degrees, or any angle value. Different rotation angle values can have varying degrees of eye box elongation or shortening effects. For example, within the range of 0 to 90 degrees, the greater the rotation angle, the greater the change in the range of the eye box EB. The smaller the rotation angle, the smaller the change in the range of the eye box EB. The effect of exceeding 90 degrees to 180 degrees is the same as the effect of 90 degrees to 0 degrees; The effect of exceeding 180 degrees to 270 degrees is the same as the effect of 0 to 90 degrees; The effect of exceeding 270 degrees to 360 degrees is the same as the effect of 90 to 0 degrees.

In the present invention, the longer the eye box EB is elongated, the more dispersed the brightness is, and the higher the brightness of the backlight source BL that needs to be increased; The shorter the eye box EB, the less dispersed the brightness, and the lower the brightness of the backlight source BL that needs to be increased.

In addition, the head up display of the present invention may further include a controller (not shown), an eye tracking system (not shown), and a drive module (not shown). The controller is electrically connected to the eye tracking system, the drive module, the backlight source, and the display panel DP to control the operation of the drive module and the backlight source based on the information provided by the eye tracking system.

The eye tracking system can detect the degree of back and forth displacement of the viewer's eyes, and the controller adjusts the rotation angle of the backlight Toroidal mirror TMr accordingly, and adjusts the brightness of the backlight source to elongate or shorten the eye box to the position of the eyes, ensuring that the viewer can continuously see the same bright, clear, and complete image.

The drive module drives the backlight Toroidal mirror TMr to rotate according to the angle set by the controller.

Although the present invention is disclosed in the foregoing embodiments, these embodiments are not intended to limit the present invention. Within the spirit and scope of the invention, modifications, finishes and combinations of embodiments are within the scope of claims of the invention.

For the scope of protection defined by the invention, please refer to the attached claims of the application.

What is claimed is:

1. A head up display device that utilizes a backlight Toroidal mirror to adjust an eye box, suitable for use with an imaging semi-reflector and comprising:
   a backlight source for projecting a backlight beam;
   the backlight Toroidal mirror being rotatable and including an X-axis curvature in an axis X and a Y-axis curvature in an axis Y, wherein the X-axis curvature is different from the Y-axis curvature, and the backlight Toroidal mirror is used to reflect the backlight beam of the backlight source;
   a display panel configured to display an image and the backlight beam from the backlight Toroidal mirror passing through the display panel to form an image beam; and
   an imaging concave mirror configured to reflect the image beam to the imaging semi-reflector to form a display panel virtual image on a side of the imaging semi-reflector away from a viewer, and a backlight real image which is on another side of the imaging semi-reflector close to the viewer and in the viewer's eyes, wherein the backlight real image is the eye box;
   wherein there is an off axis optical path between the backlight source and the backlight Toroidal mirror, the backlight source is reflected and focused on an X-axis backlight focusing plane by the X-axis curvature, the backlight source is reflected and focused on a Y-axis backlight focusing plane by the Y-axis curvature, a range of the eye box is from the X-axis backlight focusing plane to the Y-axis backlight focusing plane, a rotation of the backlight Toroidal mirror elongates or shortens the range of the eye box on an imaging optical path of the backlight real image, so that the viewer's eyes remain within the eye box while moving along the imaging optical path of the backlight real image.

2. The head up display device as claimed in claim 1, wherein the backlight Toroidal mirror rotates around its central axis.

3. The head up display device as claimed in claim 1, wherein when there is an included angle in the direction of the axis Y between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is less than the Y-axis curvature, the range of the eye box elongates as the rotation angle increases from 0 degrees to 90 degrees, and shortens as the rotation angle decreases from 90 degrees to 0 degrees.

4. The head up display device as claimed in claim 1, wherein when there is an included angle in the direction of the axis Y between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is larger than the Y-axis curvature, the range of the eye box shortens as the rotation angle increases from 0 degrees to 90 degrees, and elongates as the rotation angle decreases from 90 degrees to 0 degrees.

5. The head up display device as claimed in claim 1, wherein when there is an included angle in the direction of the axis X between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is less than the Y-axis curvature, the range of the eye box shortens as the rotation angle increases from 0 degrees to 90 degrees, and elongates as the rotation angle decreases from 90 degrees to 0 degrees.

6. The head up display device as claimed in claim 1, wherein when there is an included angle in the direction of the axis X between the optical axis of the backlight beam and the central axis of the backlight Toroidal mirror, the backlight Toroidal mirror rotates by one rotation angle about its central axis, and the X-axis curvature on the surface of the backlight Toroidal mirror illuminated by the backlight beam is larger than the Y-axis curvature, the range of the eye box elongates as the rotation angle increases from 0 degrees to 90 degrees, and shortens as the rotation angle decreases from 90 degrees to 0 degrees.

7. The head up display device as claimed in claim 1, wherein the brightness of the backlight source is increased when the backlight Toroidal mirror rotates to elongate the range of the eye box.

8. The head up display device as claimed in claim 1, wherein the brightness of the backlight source is decreased when the backlight Toroidal mirror rotates to shorten the range of the eye box.

9. The head up display device as claimed in claim 1, wherein the imaging semi-reflector is a windshield or a combiner for reflecting a portion of the image beam from the imaging concave mirror to the viewer's eyes, while allowing a portion of the light from the scene in front of the viewer to penetrate the imaging semi-reflector and reach the viewer's eyes.

* * * * *